United States Patent
Iida et al.

(10) Patent No.: US 12,542,460 B2
(45) Date of Patent: Feb. 3, 2026

(54) ROTARY ELECTRIC MACHINE

(71) Applicant: Mitsubishi Electric Corporation, Tokyo (JP)

(72) Inventors: Takayuki Iida, Tokyo (JP); Yoshihiro Miyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 305 days.

(21) Appl. No.: 18/303,969

(22) Filed: Apr. 20, 2023

(65) Prior Publication Data

US 2023/0412011 A1   Dec. 21, 2023

(30) Foreign Application Priority Data

Jun. 17, 2022   (JP) .................. 2022-097780

(51) Int. Cl.
*H02K 1/14* (2006.01)
*H02K 1/276* (2022.01)

(52) U.S. Cl.
CPC ........... *H02K 1/148* (2013.01); *H02K 1/2766* (2013.01); *H02K 2213/03* (2013.01)

(58) Field of Classification Search
CPC ........ H02K 1/27; H02K 1/276; H02K 1/2766; H02K 1/2781; H02K 1/00; H02K 1/14; H02K 1/148; H02K 1/16; H02K 1/165; H02K 16/00; H02K 16/025; H02K 16/04; H02K 1/06; H02K 21/029; H02K 2213/03
See application file for complete search history.

(56) References Cited

U.S. PATENT DOCUMENTS

| | | | | |
|---|---|---|---|---|
| 11,171,523 B2* | 11/2021 | Hazeyama | ........... | H02K 1/2766 |
| 2010/0117465 A1* | 5/2010 | Kamiya | ................ | H02K 1/148 |
| | | | | 310/156.01 |
| 2012/0019096 A1* | 1/2012 | Taniguchi | .............. | H02K 1/165 |
| | | | | 310/216.069 |
| 2012/0043849 A1 | 2/2012 | Yoneda et al. | | |
| 2019/0238014 A1 | 8/2019 | Kol et al. | | |
| 2022/0216751 A1* | 7/2022 | Okochi | ................ | H02K 1/2766 |

FOREIGN PATENT DOCUMENTS

| | | |
|---|---|---|
| CN | 110798039 A | 2/2020 |
| JP | 2007-151232 A | 6/2007 |
| JP | 2009005543 A | 1/2009 |
| JP | 2010093918 A | 4/2010 |
| JP | 2012039717 A | 2/2012 |
| WO | WO-2019174314 A1 * | 9/2019 ............... H02K 1/27 |

OTHER PUBLICATIONS

Machine Translation of WO_2019174314_A1 (Year: 2019).*
Communication dated Sep. 30, 2025 issued by the Japanese Patent Office in application No. 2022-097780.

* cited by examiner

*Primary Examiner* — Alexander A Singh
*Assistant Examiner* — Charlie Frank Mann, Jr.
(74) *Attorney, Agent, or Firm* — Sughrue Mion, PLLC

(57) ABSTRACT

Provided is a rotary electric machine that can reduce torque ripple. A stator core of the rotary electric machine is formed by combining, in the axial direction, a plurality of kinds of stator core portions having different tooth end shapes. Thus, phases of torque ripples occurring in the respective stator core portions become different from each other, so that torque ripple of the entire motor can be suppressed more efficiently.

17 Claims, 29 Drawing Sheets

ROTARY ELECTRIC MACHINE

BACKGROUND OF THE INVENTION

1. Field of the Invention

The present disclosure relates to a rotary electric machine.

2. Description of the Background Art

In recent years, motors have been required to have not only high efficiency and a high output density but also a low-vibration property, and methods for suppressing pulsation of torque which causes vibration have been proposed. Pulsation of torque includes cogging torque which occurs when current is not applied, and torque ripple which occurs when current is applied. Regarding suppression for both of cogging torque and torque ripple, a stator core having an open-slot shape in which there is a gap between adjacent tooth end portions, and a stator core having a closed-slot shape in which adjacent tooth end portions are connected, have characteristics opposite to each other in the magnitude relationship of cogging torque and torque ripple. It is known that torque pulsation of the entire motor can be suppressed in a well-balanced manner by combining such two kinds of stator cores (see, for example, Patent Document 1).

Patent Document 1: Japanese Laid-Open Patent Publication No. 2007-151232

However, the configuration as in Patent Document 1 does not sufficiently suppress torque ripple, though cogging torque and torque ripple can be reduced in a well-balanced manner.

SUMMARY OF THE INVENTION

The present disclosure has been made to solve the above problem, and an object of the present disclosure is to provide a rotary electric machine that can suppress torque ripple more efficiently.

A rotary electric machine according to one aspect of the present disclosure includes: a stator having a stator core; and a rotor having a rotor core and a plurality of permanent magnets fixed to the rotor core, the rotor being rotatable relative to the stator. The stator core has an annular core back and a plurality of teeth protruding in a radial direction from the core back, with slots formed between the teeth of the stator core. The stator core is formed by combining, in a rotation-axis direction of the rotor, a plurality of kinds of stator core portions having different tooth end shapes. Among the tooth end shapes of the plurality of kinds of stator core portions, at least one kind of tooth end shape has brims extending in a circumferential direction from the tooth and a minimum value of an electric angle of a tooth end width thereof is greater than a width of the tooth, and at least another one kind of tooth end shape is such a shape that the tooth is cut in the circumferential direction and a maximum value of an electric angle of a tooth end width thereof is smaller than a width of the tooth.

A rotary electric machine according to another aspect of the present disclosure includes: a stator having a stator core; and a rotor having a rotor core and a plurality of permanent magnets fixed to the rotor core, the rotor being rotatable relative to the stator. The stator core has an annular core back and a plurality of teeth protruding in a radial direction from the core back, with slots formed between the teeth of the stator core. The stator core is formed by combining, in a rotation-axis direction of the rotor, a plurality of kinds of stator core portions of which tooth end shapes have brims extending in a circumferential direction and electric angles of tooth end widths are different from each other.

In the rotary electric machine according to the present disclosure, the stator core is formed by combining, in the axial direction, a plurality of kinds of stator core portions having different tooth end shapes. Thus, phases of torque ripples occurring in the respective stator core portions become different, so that torque ripple in the entire motor can be suppressed.

DETAILED DESCRIPTION OF THE PREFERRED EMBODIMENTS OF THE INVENTION

Figure 1:
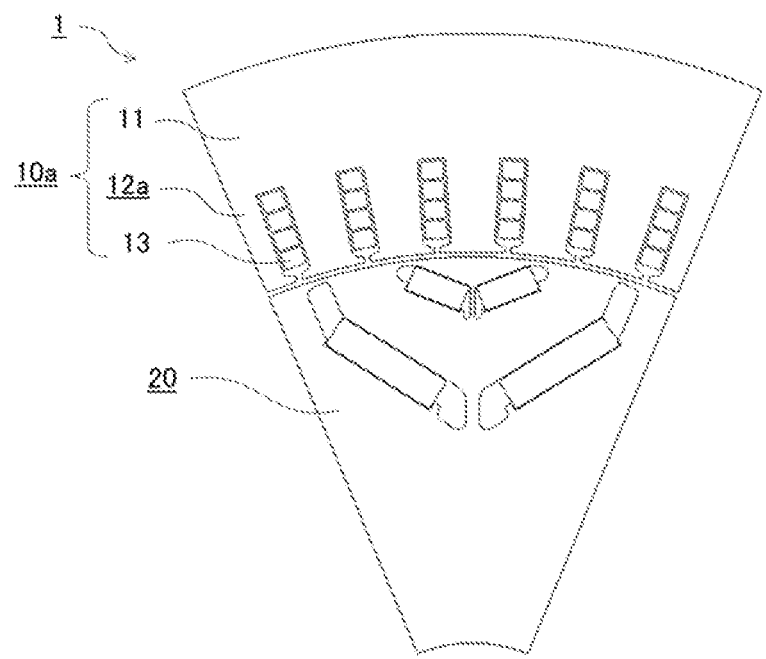
FIG. 1 is a sectional view along a direction perpendicular to the rotation axis of a rotary electric machine in which the tooth end width of a stator core is $\alpha 1$, according to the first embodiment of the present disclosure.

Hereinafter, preferred embodiments of a rotary electric machine according to the present disclosure will be described with reference to the drawings. The same or corresponding matters or parts are denoted by the same reference characters, and the detailed description thereof is omitted. Also in other embodiments, components denoted by the same reference characters will not be repeatedly described. In the first to seventh embodiments, a stator is formed by combining, in the axial direction, a stator core of which the tooth end shape has brims extending in the circumferential direction and a stator core of which the tooth end shape is a shape cut in the circumferential direction. In the eighth embodiment, a stator is formed by combining, in the axial direction, two kinds of stator cores of which the tooth end shapes have brims extending in the circumferential direction from each tooth. In the ninth embodiment, a stator is formed by combining, in the axial direction, stator cores having three kinds of tooth end shapes. In the tenth embodiment, a stator is formed by combining stator cores having four kinds of tooth end shapes. Hereinafter, each of the embodiments will be described in detail.

First Embodiment

[Double-V-Shaped Slots, Two Kinds of Stator Cores, Rotor Cutout, Phase Difference=180 Degrees]

Figure 2:
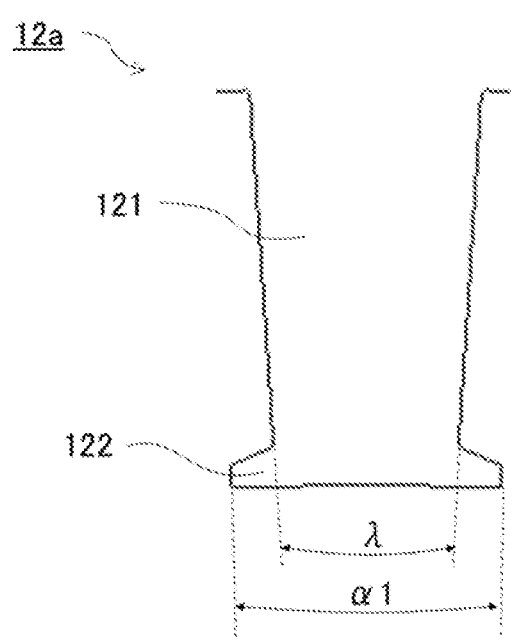
FIG. 2 is an enlarged view of tooth part in FIG. 1.
Figure 3:
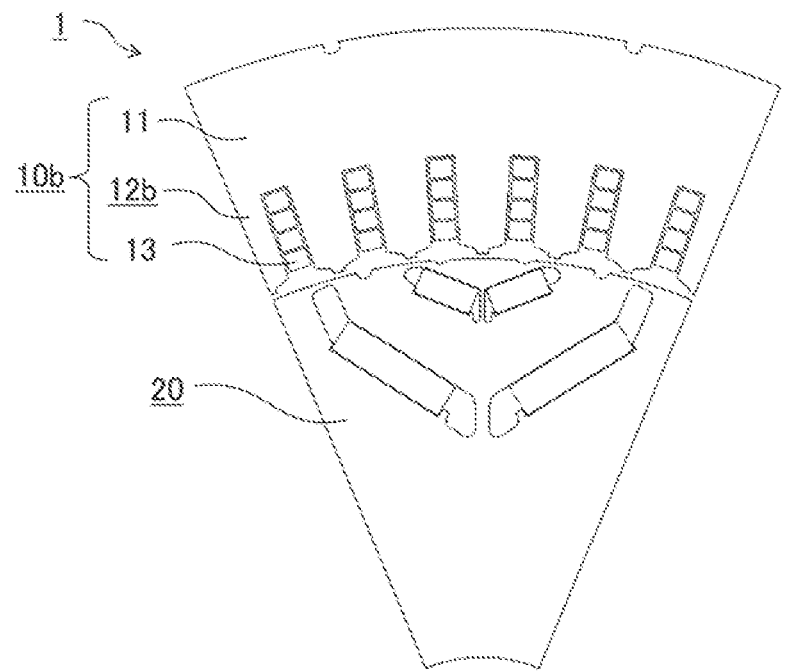
FIG. 3 is a sectional view along a direction perpendicular to the rotation axis of the rotary electric machine in which the tooth end width of a stator core is $\alpha 2$, according to the first embodiment.
Figure 4:
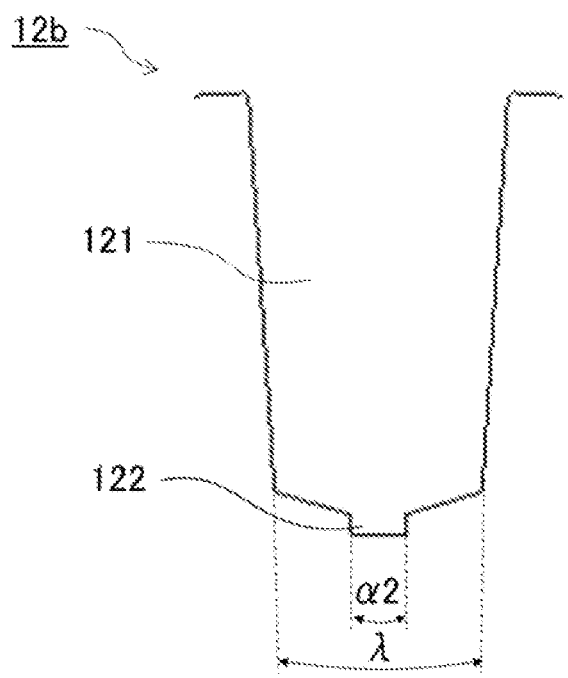
FIG. 4 is an enlarged view of tooth part in FIG. 3.
Figure 5:
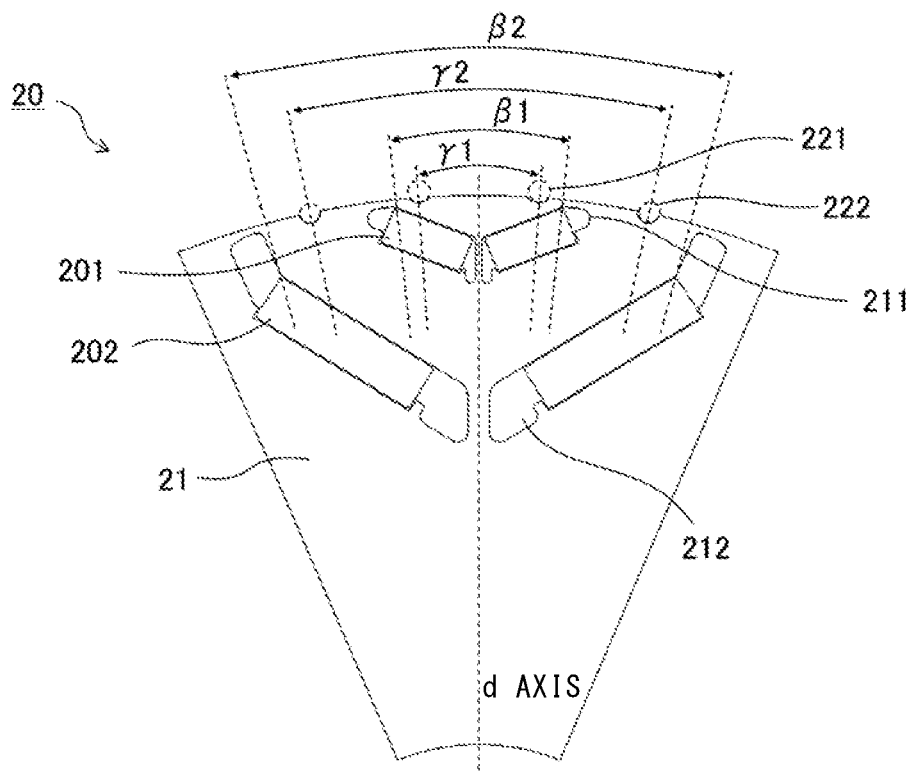
FIG. 5 is a sectional view along a direction perpendicular to the rotation axis of a rotor of the rotary electric machine according to the first embodiment.
Figure 6:
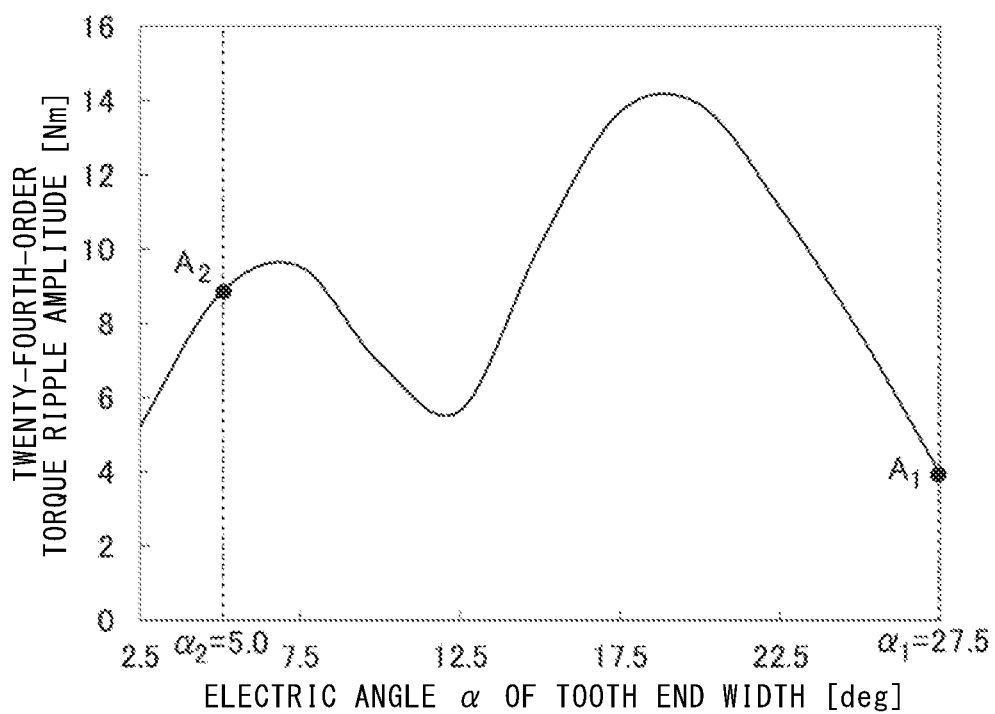
FIG. 6 shows change in the amplitude of twenty-fourth-order torque ripple with respect to a tooth end width $\alpha$ of the stator core when the rotation-axis-direction length of the stator core is L in a case of using the rotor of the rotary electric machine according to the first embodiment.
Figure 7:
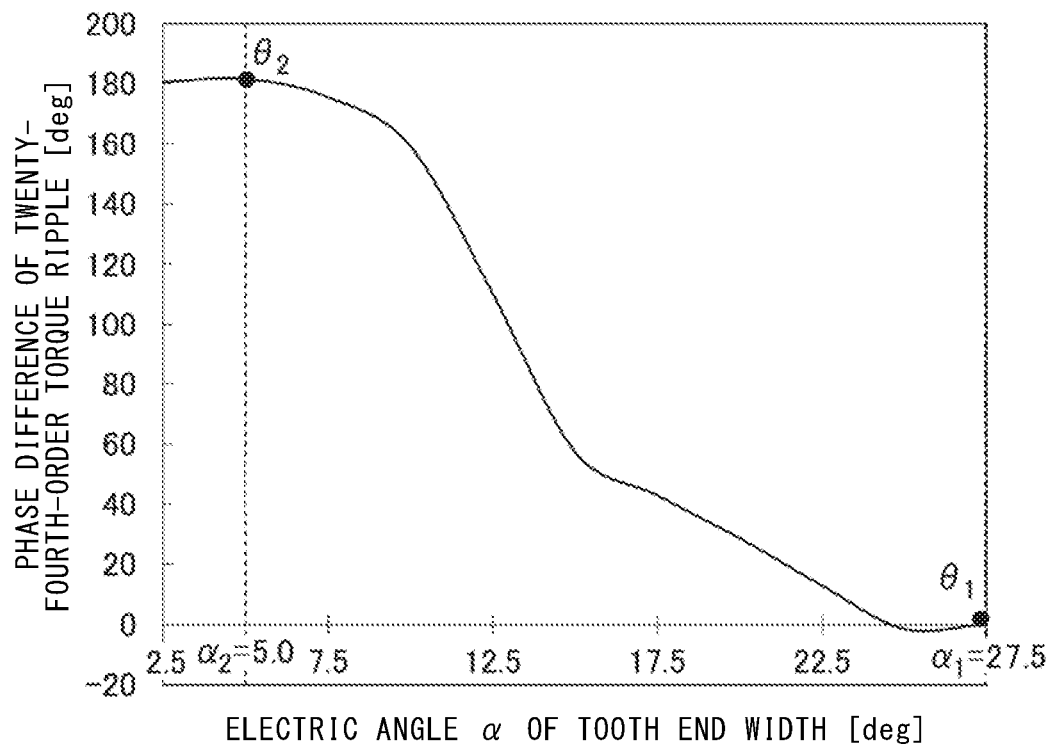
FIG. 7 shows change in a phase difference of twenty-fourth-order torque ripple where a phase when the electric angle of the tooth end width is 27.5 degrees is used as a reference, with respect to the tooth end width $\alpha$ of the stator core, when the axial-direction length of the stator core is L in a case of using the rotor of the rotary electric machine according to the first embodiment.
Figure 8:
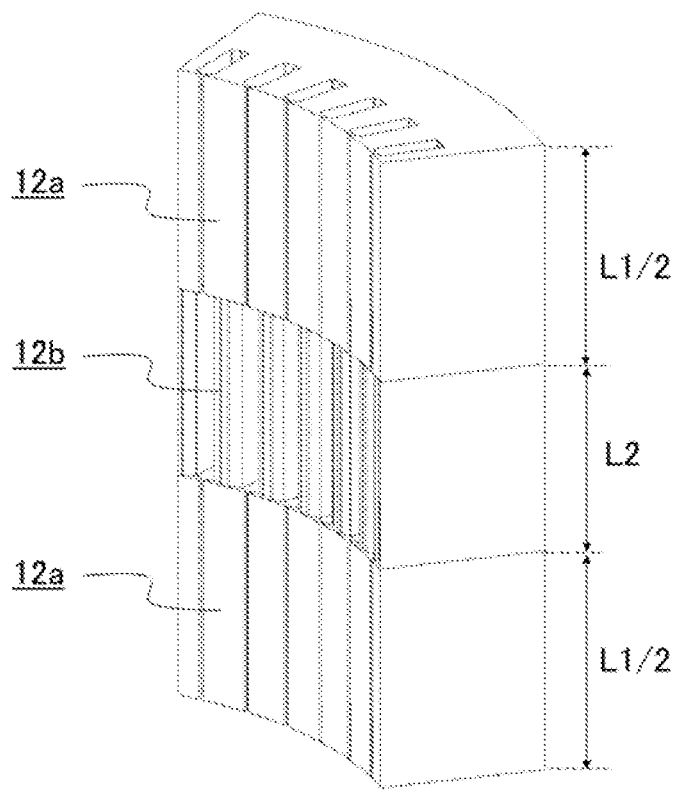
FIG. 8 is a perspective view of a cross-section of ⅛ part in a structure example of a stator of the rotary electric machine according to the first embodiment.
Figure 9:
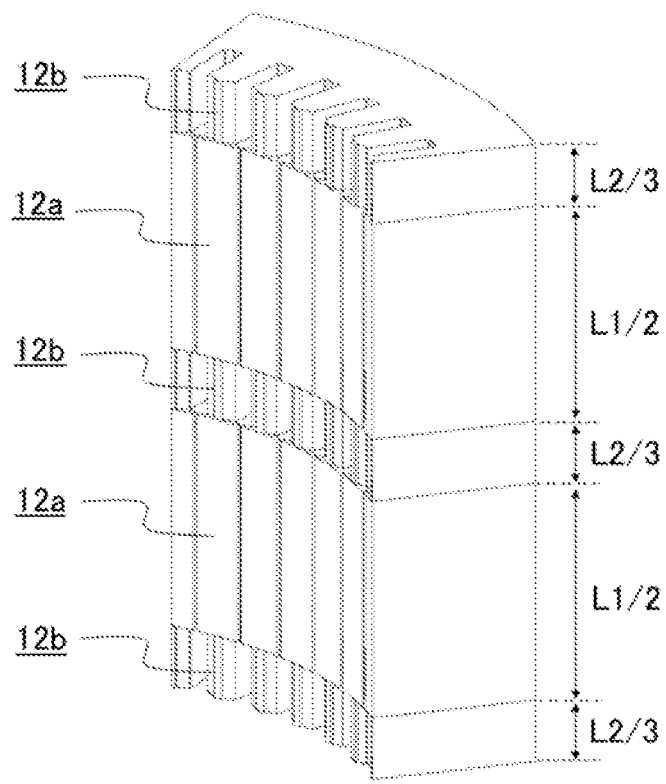
FIG. 9 is a perspective view of a cross-section of ⅛ part in a structure example of the stator of the rotary electric machine according to the first embodiment.
Figure 10:
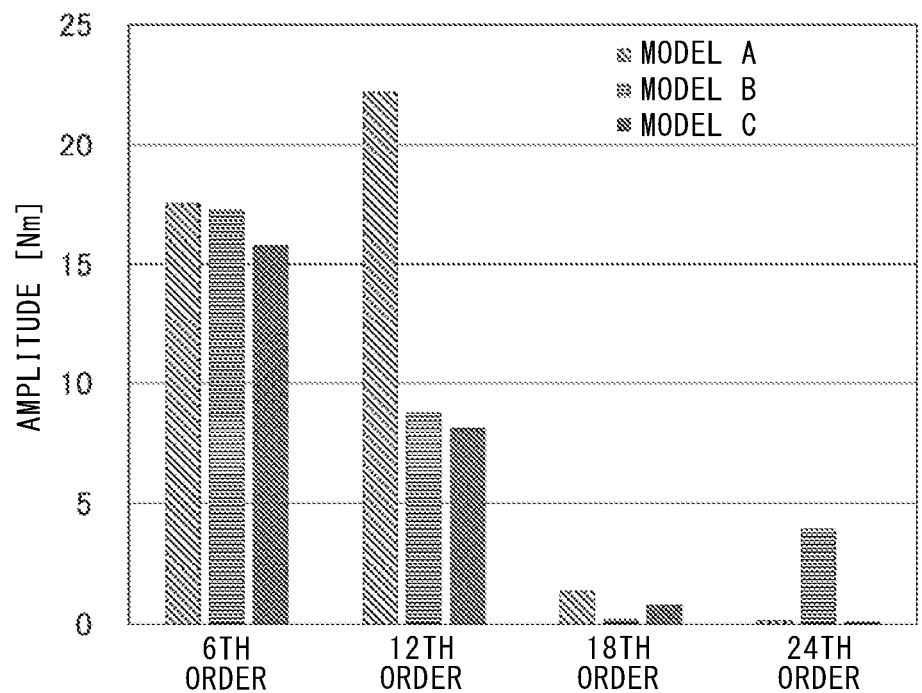
FIG. 10 shows comparison of torque ripples in a model A, a model B, and a model C.

FIG. 1 is a sectional view along a direction perpendicular to the rotation axis of a rotor of a rotary electric machine (hereinafter, referred to as rotation axis) in which the tooth end width of a stator core is α1, according to the first embodiment of the present disclosure, and FIG. 2 is an enlarged view of tooth part thereof. FIG. 3 is a sectional view along a direction perpendicular to the rotation axis in which the tooth end width of a stator core is α2, according to the first embodiment, and FIG. 4 is an enlarged view of tooth part thereof. FIG. 5 is a sectional view along a direction perpendicular to the rotation axis of the rotor of the rotary electric machine according to the first embodiment. FIG. 6 shows change in the amplitude of twenty-fourth-order torque ripple with respect to a tooth end width α of the stator core when the rotation-axis-direction length of the stator core is L in a case of using the rotor of the rotary electric machine according to the first embodiment. FIG. 7 shows change in a phase difference of twenty-fourth-order torque ripple where a phase when the electric angle of the tooth end width is 27.5 degrees is used as a reference, with respect to the tooth end width α of the stator core, when the rotation-axis-direction length of the stator core is L in a case of using the rotor of the rotary electric machine according to the first embodiment. FIG. 8 and FIG. 9 are perspective views of cross-sections of ⅛ parts in structure examples of the stator of the rotary electric machine according to the first embodiment. FIG. 10 shows comparison of torque ripples in a model A, a model B, and a model C. The model A is a structure formed by only one kind of stator 10a and not having cutouts 221 and 222 on the outer circumference of the rotor. The model B is a structure having cutouts 221 and 222 on the outer circumference of the rotor of the rotary electric machine in the model A formed by only one kind of stator 10a. The model C is a structure of the first embodiment in which two kinds of stators 10a and 10b are combined and cutouts 221 and 222 are formed on the outer circumference of the rotor.

In FIG. 1, a motor 1 which is the rotary electric machine is composed of a stator 10a and a rotor 20 located on the radially inner side of the stator 10a coaxially therewith. As shown in FIG. 1, the stator 10a has stator teeth 12a extending radially inward from an annular stator back core 11, and stator coils 13 arranged in stator slots which are U-shaped areas surrounded by adjacent stator teeth 12a and the stator back core 11.

In the present embodiment, forty-eight stator teeth 12a are equally formed along the circumferential direction, and four wires of stator coils 13 are similarly located in each of forty-eight stator slots. The stator coil 13 is connected in series to the stator coil 13 located in the sixth stator slot adjacent in the circumferential direction, and the stator coils 13 are wound in a distributed manner.

As shown in FIG. 2, the stator tooth 12a has a tooth extension portion 121 extending radially inward from the stator back core 11 and a tooth end portion 122 having a tooth end shape protruding symmetrically toward both sides in the circumferential direction from the tooth extension portion 121. Here, the electric angle of the tooth width which is the width dimension of the tooth extension portion 121 is denoted by A, and the electric angle of the tooth end width which is the width dimension of the tooth end is denoted by a. When the electric angle α of the tooth end width of the tooth end portion 122 is α1, α1≤λ is satisfied, where λ is 19.0 degrees and α1 is 27.5 degrees. The value of α is calculated as an angle formed in the rotation direction of the rotor 20 by two lines connecting the rotation center of the rotor 20 and both ends in the width direction at the end of one stator tooth 12a in a cross section perpendicular to the rotation axis.

In FIG. 3, the motor 1 which is the rotary electric machine is composed of a stator 10b and the rotor 20 located on the radially inner side of the stator 10b coaxially therewith. As shown in FIG. 3, the stator 10b has stator teeth 12b extending radially inward from the annular stator back core 11 and the stator coils 13 located in stator slots which are C-shaped areas surrounded by adjacent stator teeth 12b and the stator back core 11. In the first embodiment, forty-eight stator teeth 12b are equally formed along the circumferential direction, and four wires of stator coils 13 are similarly located in each of forty-eight stator slots. The stator coil 13 is connected in series to the stator coil 13 located in the sixth stator slot adjacent in the circumferential direction.

As shown in FIG. 4, the stator tooth 12b has a tooth extension portion 121 extending radially inward from the stator back core 11, and a tooth end portion 122 having a tooth end shape in which the tooth extension portion 121 is cut symmetrically on both sides in the circumferential direction. When the electric angle α of the tooth end width of the tooth end portion 122 is α2, λ>α2 is satisfied, where α2 is 5.0 degrees. The value of a is calculated in the same manner as described above.

Hereinafter, the stator core having the stator teeth 12a is referred to as stator core 12a, and the stator core having the stator teeth 12b is referred to as stator core 12b. The same applies to a stator core 12c and a stator core 12d.

As shown in FIG. 5, the rotor 20 has an annular rotor core 21, and has a pair of first-layer magnet slots 211 and a pair of second-layer magnet slots 212, each pair of slots being arranged in a V shape and opposed to each other such that the distance therebetween is narrowed toward the radially inner side while being centered at a d axis of the rotor core 21. A pair of first-layer magnets 201 and a pair of second-layer magnets 202 are inserted in the pair of first-layer magnet slots 211 and the pair of second-layer magnet slots 212, respectively. The pair of first-layer magnets 201 and the pair of second-layer magnets 202 have flat plate shapes, are oriented along short sides, and are magnetized so as to be all directed toward the same direction in the radial direction.

Eight sets of the magnets, each set being composed of the above four magnets, are equally arranged in the circumferential direction. The eight sets are arranged in the same manner such that the magnetization directions of the sets adjacent in the circumferential direction are alternately directed toward the inner side and the outer side in the radial direction. Here, in a cross-section perpendicular to the rotation axis, a pole arc angle which is the electric angle of an angle formed in the rotation direction of the rotor 20 by two lines connecting the rotation center of the rotor 20 and rotor-surface-side corners of the magnets arranged inside the rotor 20, is denoted by β. Then, as shown in FIG. 5, the pole arc angle of the first-layer magnets 201 is denoted by β1, and the pole arc angle of the second-layer magnets 202 is denoted by β2.

On the outer circumference of the rotor core 21, symmetrically with respect to the d axis, circular-shaped cutouts 221 are provided within the pole arc angle of the first-layer magnets 201, and circular-shaped cutouts 222 are provided between the pole arc angle of the first-layer magnets 201 and the pole arc angle of the second-layer magnets 202, that is, a total of four cutouts are provided.

In the cross section perpendicular to the rotation axis, a cutout angle which is the electric angle of an angle formed in the rotation direction of the rotor 20 by two lines connecting the rotation center of the rotor 20 and the centers of arcs forming the cutouts provided on the outer circumference of the rotor symmetrically with respect to the d axis, is denoted by γ. Then, as shown in FIG. 5, the cutout angle of the cutouts 221 is denoted by γ1, and the cutout angle of the cutouts 222 is denoted by γ2.

Therefore, the pole arc angles and the cutout angles in the first embodiment satisfy β2>γ2>β1>γ1, β1 is 50.0 degrees, β2 is 127.5 degrees, γ1 is 35.0 degrees, and γ2 is 100.0 degrees. With this configuration, a distributed-winding motor having eight poles and forty-eight slots is formed.

As shown in FIG. 6, when the tooth end width α is changed, the amplitude of twenty-fourth-order torque ripple changes. In addition, as shown in FIG. 7, when the tooth end width is changed, the phase of twenty-fourth-order torque ripple can be changed. Here, the rotation-axis-direction lengths of the stator cores in which the tooth end widths are α1 and α2 are respectively denoted by L1 and L2, the amplitudes of twenty-fourth-order torque ripples occurring in the stator cores in which the tooth end widths are α1 and α2 when the rotation-axis-direction length of the stator core is L are respectively denoted by A1 and A2 (see FIG. 6), and phase differences of twenty-fourth-order torque ripples in the stator cores in which α1 is 27.5 degrees and α2 is 5.0 degrees using the phases of twenty-fourth-order torque ripple as a reference are respectively denoted by θ1 and θ2 (see FIG. 7). Then, twenty-fourth-order torque ripple H occurring in the rotary electric machine of the first embodiment is represented as follows.

[Mathematical 1]

$$H = \sum_{k=1}^{n} \frac{L_k}{L} A_k \cos(t + \theta_k) \quad \text{(Expression 1)}$$

Here, n is 2 and t is the electric angle of the rotation angle. In addition, L is the rotation-axis-direction length of the entirety of the combined stator cores.

In addition, θ1 is 0.0 degrees, θ2 is 180 degrees, and θ2−θ1 is 180.0 degrees. Therefore, the values of L1 and L2 that minimize H are obtained from L1:L2=A2:A1, and L1/L2 which is the ratio of L1 and L2 is about 2.33.

As shown in FIG. 8, the motor 1 includes the stator core 12a having the rotation-axis-direction length L1 and the stator core 12b having the rotation-axis-direction length L2, and L1 and L2 are set such that L1/L2 is about 2.33. The stator having combination of the stator core 12a and the stator core 12b is formed symmetrically in the rotation-axis direction, and the stator core 12b is sandwiched between two stator cores 12a divided in the rotation-axis direction. In this configuration, two stator cores having different tooth end widths α are combined in the rotation-axis direction with L1/L2 set at about 2.33, whereby twenty-fourth-order torque ripple can be suppressed almost completely.

Since the stator having combination of the stator core 12a and the stator core 12b is formed symmetrically in the rotation-axis direction, magnetic attraction forces acting on the entire rotor can be made symmetric in terms of rotation-axis-direction positions and thus can be balanced. Then, since the magnetic attraction forces acting at various axial-direction positions of the rotor are made symmetric in the axial direction, a force acting in the axial direction of the rotor is reduced, whereby vibration and bearing damage can be prevented.

As shown in FIG. 9, one of three divided stator cores 12b may be sandwiched between two divided stator cores 12a, and these may be sandwiched between the other two of the three divided stator cores 12b. Also in this structure, the stator having combination of the stator core 12a and the stator core 12b is formed symmetrically in the rotation-axis direction, whereby magnetic attraction forces can be balanced. Thus, as described above, a force acting in the axial direction of the rotor is reduced, whereby vibration and bearing damage can be prevented.

Here, the above positional relationship between the stator core 12a and the stator core 12b may be reversed. In addition, the number of axial-direction divided parts of each stator core may be any number as long as the stator cores when stacked are symmetric in the axial direction. In addition, the axial-direction lengths of the divided stator cores may not necessarily be equal to each other, and the axial-direction lengths of the divided stator cores may be any lengths as long as the stator cores when stacked are symmetric in the axial direction.

The model A shown in FIG. 10 is a structure formed by only one kind of stator 10a and not having the cutouts 221 and 222 on the outer circumference of the rotor. The model B is a structure having the cutouts 221 and 222 on the outer circumference of the rotor of the rotary electric machine in the model A formed by only one kind of stator 10a. The model C is a structure of the present embodiment in which two kinds of stators 10a and 10b are combined and the cutouts 221 and 222 are formed on the outer circumference of the rotor. In comparison between the model A and the model B in FIG. 10, the model B can reduce twelfth-order torque ripple but increases twenty-fourth-order torque ripple. In the model C corresponding to the motor 1 of the present embodiment, it is found that twelfth-order and twenty-fourth-order torque ripples can be suppressed at the same time because a phase difference of twenty-fourth-order torque ripples occurring in the respective stator cores is 180 degrees.

As described above, by providing cutouts to the rotor, a magnetic flux density distribution in an air gap is changed, whereby it is possible to reduce torque ripple for an order different from the order of torque ripple that can be suppressed by combining the stator cores having different tooth end shapes.

As described above, by combining, in the axial direction, a plurality of kinds of stator cores having different tooth end shapes, the phases of torque ripples occurring in the respective stator cores are made different from each other, whereby torque ripple in the entire motor can be reduced. In particular, in the motor having eight poles and forty-eight slots, when the tooth end shapes are made different from each other, the phase of twenty-fourth-order torque ripple can be changed. Then, if each of the phase differences of twenty-fourth-order torque ripples occurring in N kinds of stator cores is 360/N degrees, it is possible to suppress twenty-fourth-order torque ripple almost completely by adjusting the axial-direction lengths of the respective stator cores. In a case where two kinds of stator cores having different tooth end shapes are combined in the axial direction, the phase difference of torque ripples occurring in the respective stator cores becomes 90 to 180 degrees, whereby torque ripple in the entire motor can be reduced. This effect is similarly provided also in the following embodiments.

The tooth width of the stator core having a distributed winding structure is small. Therefore, by combining the stator core having brims extending from the tooth end and the stator core of which the tooth end is cut, the change amount of the tooth end width can be increased and the phase change amount of torque ripple can be increased. Thus, the phase difference of torque ripple is increased, whereby torque ripple can be suppressed more effectively.

Second Embodiment

[Core Ratio Different from First Embodiment]

Figure 11:
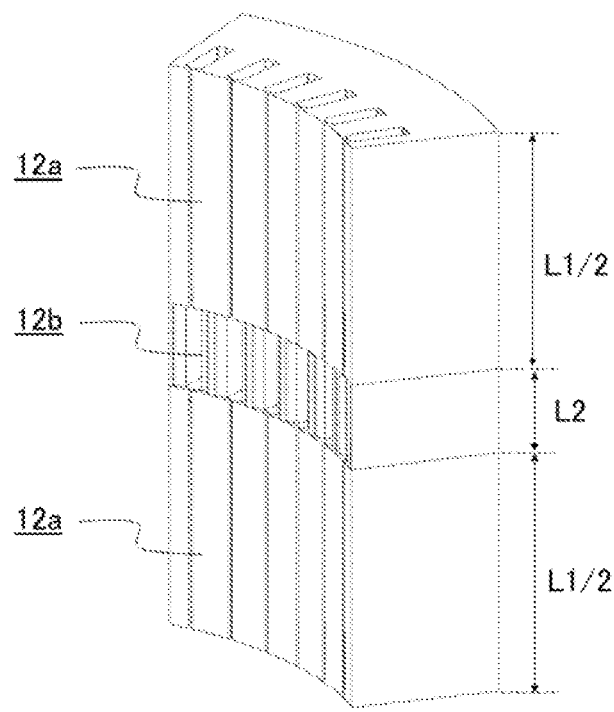
FIG. 11 is a perspective view of a cross-section of ⅛ part in a structure example of a stator of a rotary electric machine according to the second embodiment of the present disclosure.

FIG. 11 is a perspective view of a cross-section of ⅛ part in a structure example of a stator of a rotary electric machine according to the second embodiment of the present disclosure. As shown in FIG. 11, L1 which is the rotation-axis-direction length of the stator core 12a and L2 which is the rotation-axis-direction length of the stator core 12b are set such that L1/L2 is about 5.67. The other configurations are the same as in the first embodiment.

With this configuration, while twenty-fourth-order torque ripple is reduced, the ratio of the stator core 12b having a smaller tooth end width is reduced, whereby torque can be improved. In addition, if the value of L1/L2 is greater than that when twenty-fourth-order torque ripple is minimized, and the value of L1/L2 is such a value that can reduce twenty-fourth-order torque ripple, the same effects are provided.

Third Embodiment

[Cores Stacked in Different Way from First Embodiment]

Figure 12:
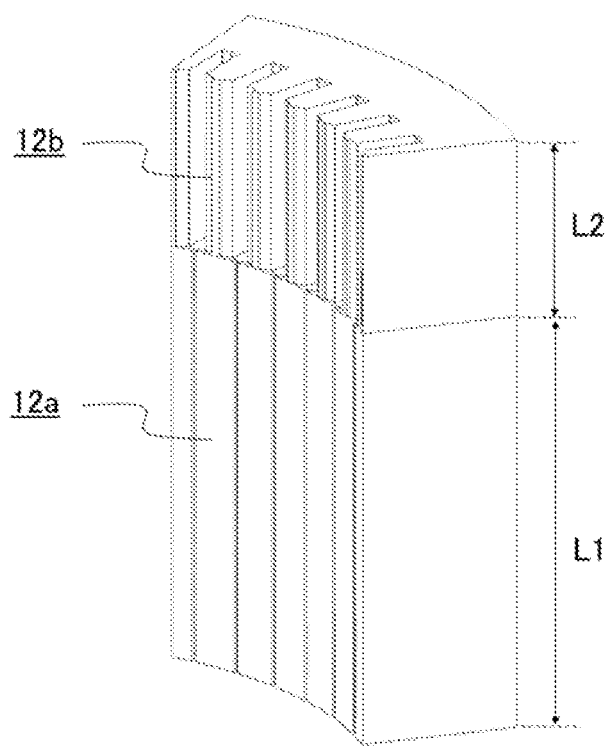
FIG. 12 is a perspective view of a cross-section of ⅛ part in the circumferential direction in a structure in which two different kinds of stator cores are sequentially stacked in the axial direction, in a rotary electric machine according to the third embodiment of the present disclosure.
Figure 13:
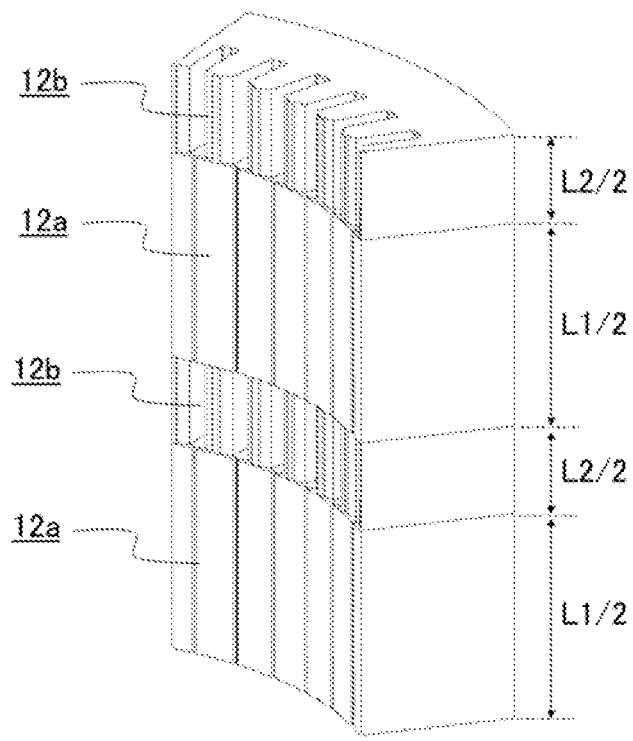
FIG. 13 is a perspective view of a cross-section of ⅛ part in the circumferential direction in a structure in which two different kinds of stator cores are each divided into two pieces in the axial direction and then are alternately stacked, in the rotary electric machine according to the third embodiment.

FIG. 12 is a perspective view of a cross-section of ⅛ part in the circumferential direction in a structure in which two different kinds of stator cores are sequentially stacked in the rotation-axis direction, in a stator of a rotary electric machine according to the third embodiment of the present disclosure. FIG. 13 is a perspective view of a cross-section of ⅛ part in the circumferential direction in a structure in which two different kinds of stator cores are each divided into two pieces in the rotation-axis direction and then are alternately stacked.

The stator shown in FIG. 12 is formed such that the stator core 12a having the rotation-axis-direction length L1 and the stator core 12b having the rotation-axis-direction length L2 are sequentially stacked in the rotation-axis direction. The other configurations are the same as in the first embodiment. With this configuration, the number of stator cores composing the stator can be minimized, whereby manufacturing performance is improved.

The stator shown in FIG. 13 has a structure in which the stator core 12a and the stator core 12b are each divided into two pieces in the rotation-axis direction and then are sequentially and alternately stacked in the rotation-axis direction. The other configurations are the same as in the first embodiment. With this configuration, in such a case where two kinds of stator cores composing the stator are each divided into a plurality of pieces, the number of stator cores can be decreased, whereby manufacturing performance is improved.

Fourth Embodiment

[Double-V-Shaped Slots, Two Kinds of Stator Cores, Phase Difference=180 Degrees]

Figure 14:
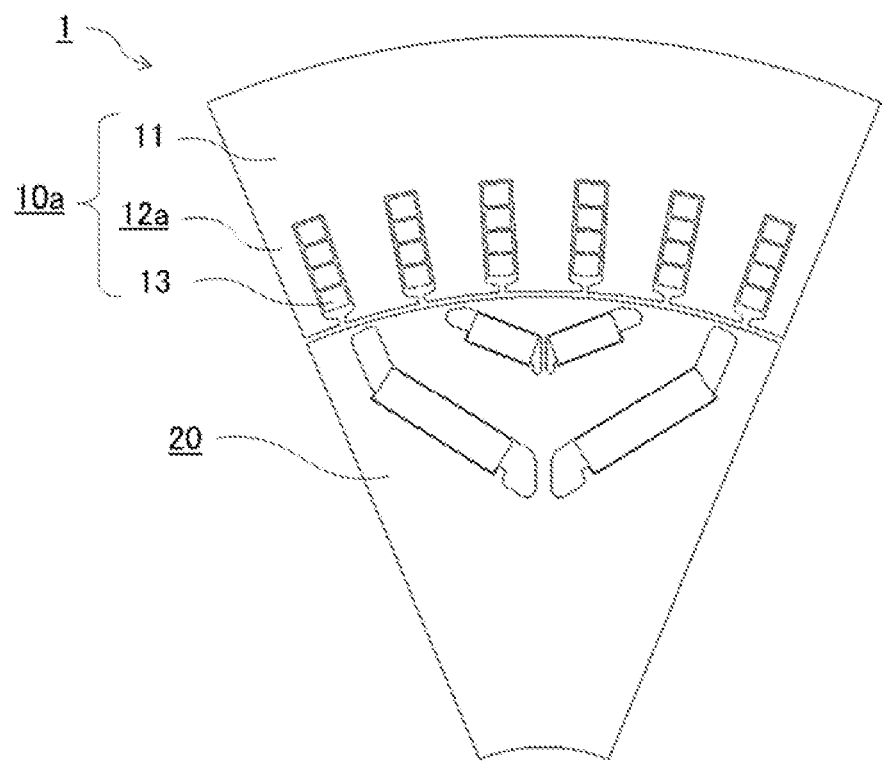
FIG. 14 is a sectional view along a direction perpendicular to the rotation axis of a rotary electric machine in which the tooth end width of a stator core is $\alpha 1$, according to the fourth embodiment of the present disclosure.
Figure 15:
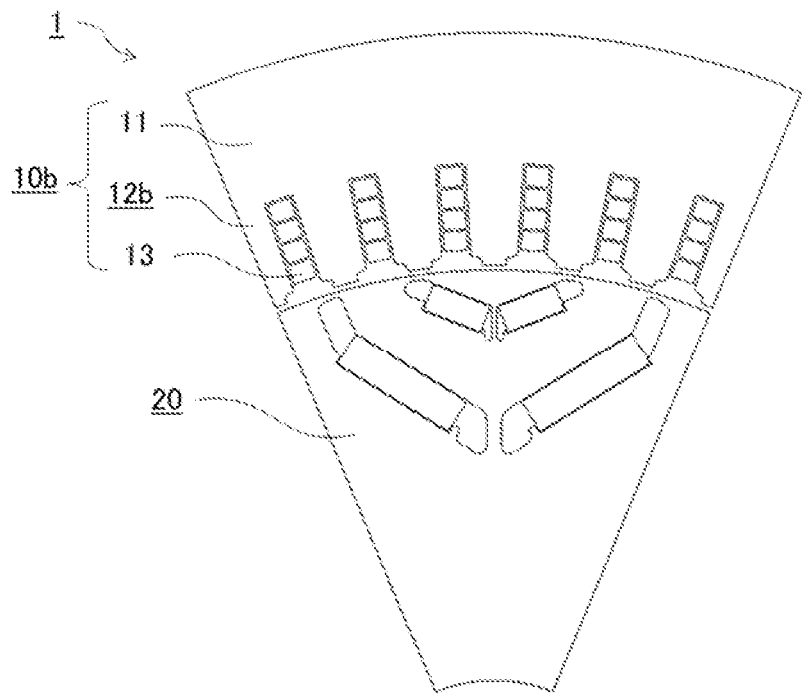
FIG. 15 is a sectional view along a direction perpendicular to the rotation axis of the rotary electric machine in which the tooth end width of a stator core is α2, according to the fourth embodiment.
Figure 16:
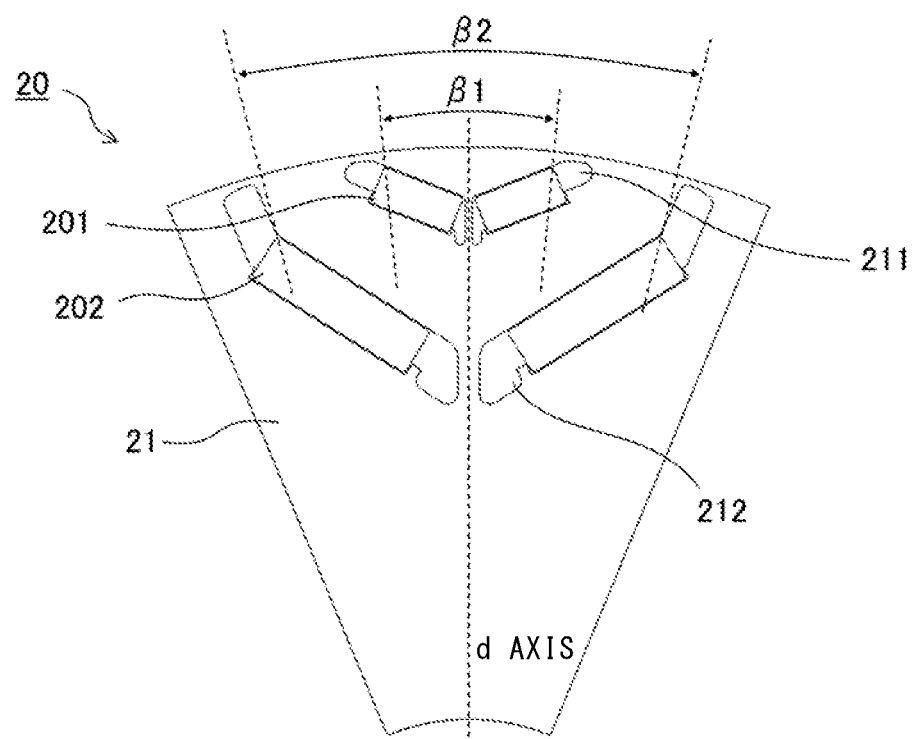
FIG. 16 is a sectional view along a direction perpendicular to the rotation axis of a rotor of the rotary electric machine according to the fourth embodiment.
Figure 17:
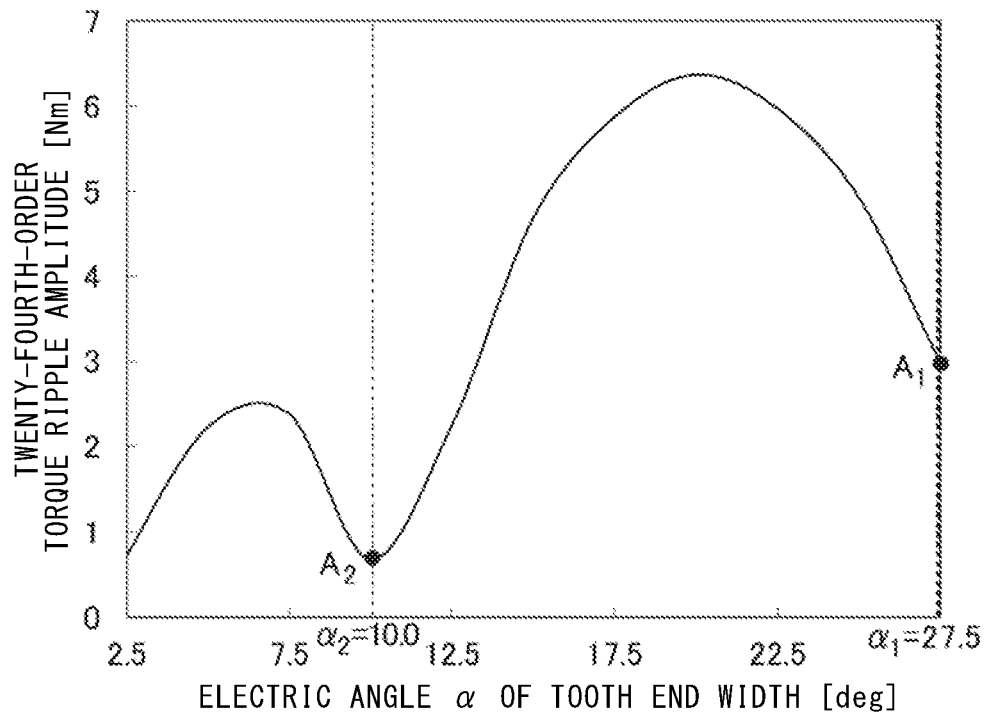
FIG. 17 shows change in the amplitude of twenty-fourth-order torque ripple with respect to a tooth end width α of the stator core when the axial-direction length of the stator core is L in a case of using the rotor of the rotary electric machine according to the fourth embodiment.
Figure 18:
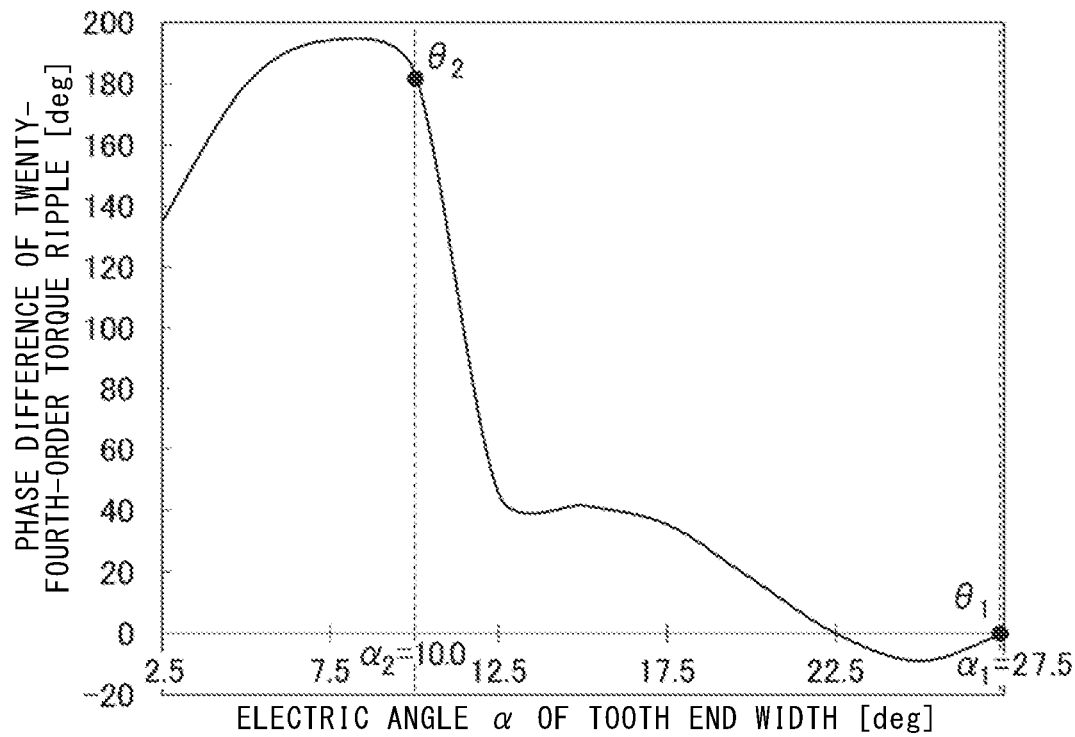
FIG. 18 shows change in a phase difference of twenty-fourth-order torque ripple where a phase when the electric angle of the tooth end width is 27.5 degrees is used as a reference, with respect to the tooth end width α of the stator core, when the axial-direction length of the stator core is L in a case of using the rotor of the rotary electric machine according to the fourth embodiment.
Figure 19:
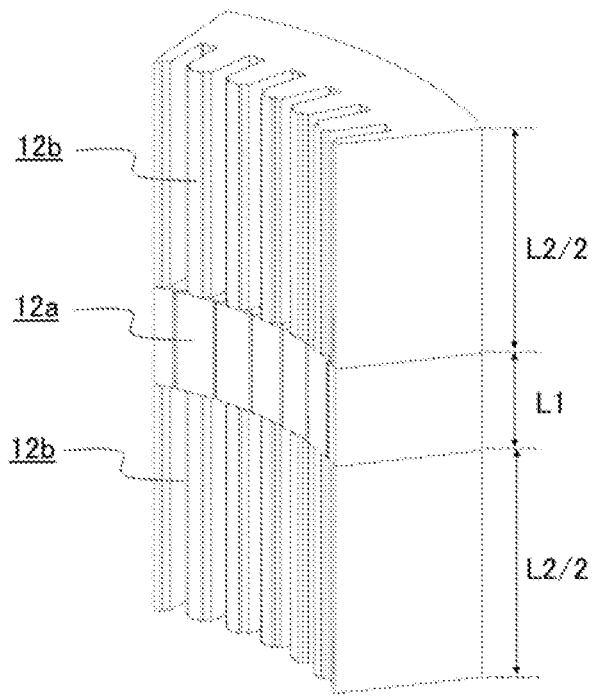
FIG. 19 is a perspective view of a cross-section of ⅛ part in a structure example of a stator of the rotary electric machine according to the fourth embodiment.

FIG. 14 is a sectional view along a direction perpendicular to the rotation axis in a case where the tooth end width of a stator core is α1, according to the fourth embodiment of the present disclosure. FIG. 15 is a sectional view along a direction perpendicular to the rotation axis in which the tooth end width of a stator core is α2, according to the fourth embodiment. FIG. 16 is a sectional view along a direction perpendicular to the rotation axis of a rotor of a rotary electric machine according to the fourth embodiment. FIG. 17 shows change in the amplitude of twenty-fourth-order torque ripple with respect to the tooth end width α of the stator core when the rotation-axis-direction length of the stator core is L in a case of using the rotor of the rotary electric machine according to the fourth embodiment. FIG. 18 shows change in a phase difference of twenty-fourth-order torque ripple where a phase when the electric angle of the tooth end width is 27.5 degrees is used as a reference, with respect to the tooth end width α of the stator core, when the rotation-axis-direction length of the stator core is L in a case of using the rotor of the rotary electric machine according to the fourth embodiment. FIG. 19 is a perspective view of a cross-section of ⅛ part in a structure example of a stator of the rotary electric machine according to the fourth embodiment.

As shown in FIG. 14, the basic configuration of the rotary electric machine of the present embodiment in which the tooth end width of the stator core 12a is α1 is the same as that in FIG. 1, and α1 is 27.5 degrees. In addition, as shown in FIG. 15, the basic configuration of the rotary electric machine of the present embodiment in which the tooth end width of the stator core 12b is α2 is the same as that in FIG. 3, but α2 is 10.0 degrees.

As shown in FIG. 16, the rotor 20 has an annular rotor core 21, and has a pair of first-layer magnet slots 211 and a pair of second-layer magnet slots 212, each pair of slots being arranged in a V shape and opposed to each other such that the distance therebetween is narrowed toward the radially inner side while being centered at the d axis of the rotor core 21. A pair of first-layer magnets 201 and a pair of second-layer magnets 202 are inserted in the pair of first-layer magnet slots 211 and the pair of second-layer magnet slots 212, respectively. The pair of first-layer magnets 201 and the pair of second-layer magnets 202 have flat plate shapes, are oriented along short sides, and are magnetized so as to be all directed toward the same direction in the radial direction. Eight sets of the magnets, each set being composed of the above four magnets, are equally arranged in the circumferential direction in the same manner such that the magnetization directions of the sets adjacent in the circumferential direction are alternately directed toward the inner side and the outer side in the radial direction. Where the pole arc angle of the first-layer magnets 201 is denoted by β1 and the pole arc angle of the second-layer magnets 202 is denoted by β2, β1 is 57.5 degrees and β2 is 125.0 degrees.

As shown in FIG. 17 and FIG. 18, as in the first embodiment, when the tooth end width α of the stator core is changed, the amplitude and the phase of twenty-fourth-order torque ripple are changed. In addition, θ1 is 0.0 degrees, θ2 is 180 degrees, and θ2−θ1 is 180.0 degrees. Therefore, the rotation-axis-direction lengths L1 and L2 of the stator core 12a and the stator core 12b that minimize H are obtained from L1:L2=A2:A1, and L1/L2 which is the ratio of L1 and L2 is about 0.212.

As shown in FIG. 19, the rotary electric machine according to the fourth embodiment includes the stator core 12a having the rotation-axis-direction length L1 and the stator core 12b having the rotation-axis-direction length L2, and L1 and L2 are set such that L1/L2 is about 0.212. The way of stacking the stator cores is the same as that in FIG. 8.

In this configuration, two kinds of stator cores having different tooth end widths α are combined in the rotation-axis direction with L1/L2 set at about 0.212, whereby twenty-fourth-order torque ripple can be suppressed almost completely.

Since the stator having combination of the stator core 12a and the stator core 12b is formed symmetrically in the rotation-axis direction, magnetic attraction forces acting on the entire rotor can be made symmetric in terms of rotation-axis-direction positions and thus can be balanced. Thus, a force acting in the axial direction of the rotor is reduced, whereby vibration and bearing damage can be prevented.

The same effects are obtained even if the number of stator cores divided in the rotation-axis direction is changed as shown in FIG. 9.

In the rotary electric machine of the present embodiment, if cutouts are provided on the outer circumference of the rotor core as in the first embodiment, it is possible to suppress twelfth-order torque ripple and twenty-fourth-order torque ripple at the same time, as in the first embodiment.

In the rotary electric machine of the present embodiment, if the stator cores are stacked such that the ratio of the stator core having a larger tooth end width α, of the two kinds of stator cores, is greater as in the second embodiment, it is possible to increase torque while reducing twenty-fourth-order torque ripple, as in the second embodiment.

In the rotary electric machine of the present embodiment, if the stator cores are stacked asymmetrically in the rotation-axis direction as in the third embodiment, it is possible to decrease the number of stator cores and improve manufacturing performance, as in the third embodiment.

Fifth Embodiment

[Double-V-Shaped Slots, Two Kinds of Stator Cores, Phase Difference=90 to 180 Degrees]

Figure 20:
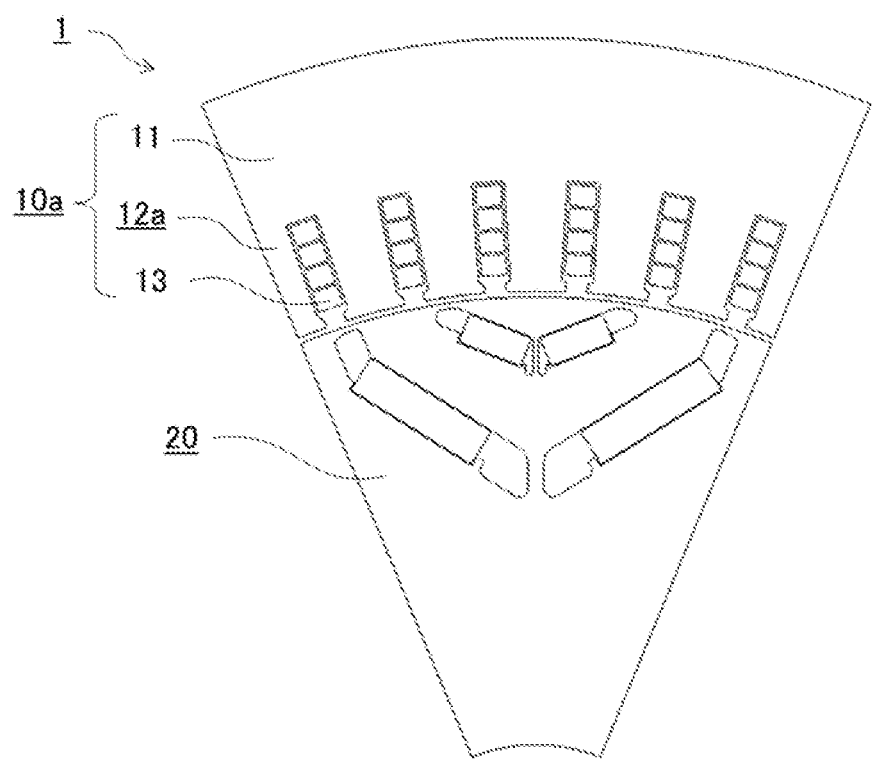
FIG. 20 is a sectional view along a direction perpendicular to the rotation axis of a rotary electric machine in which the tooth end width of a stator core is α1, according to the fifth embodiment of the present disclosure.
Figure 21:
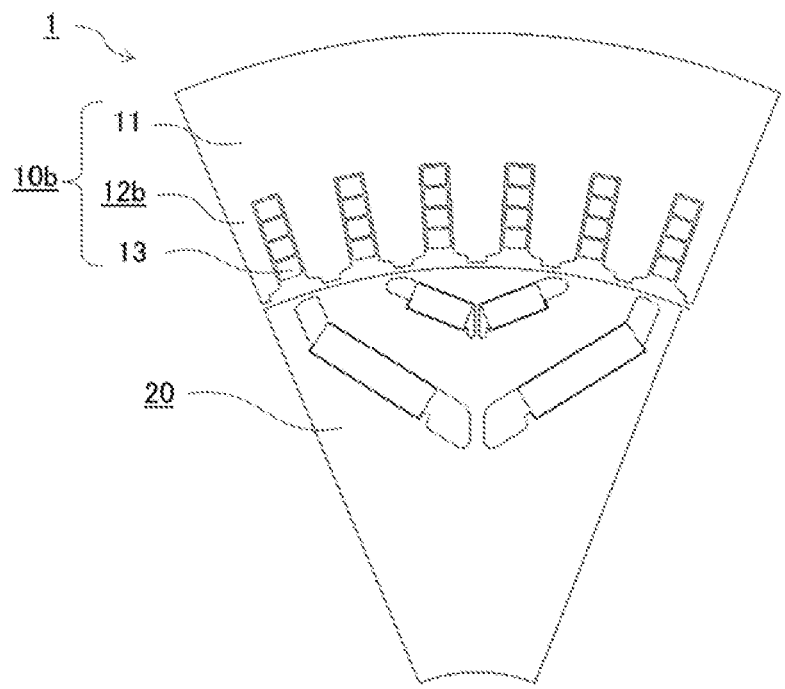
FIG. 21 is a sectional view along a direction perpendicular to the rotation axis of the rotary electric machine in which the tooth end width of a stator core is α2, according to the fifth embodiment.
Figure 22:
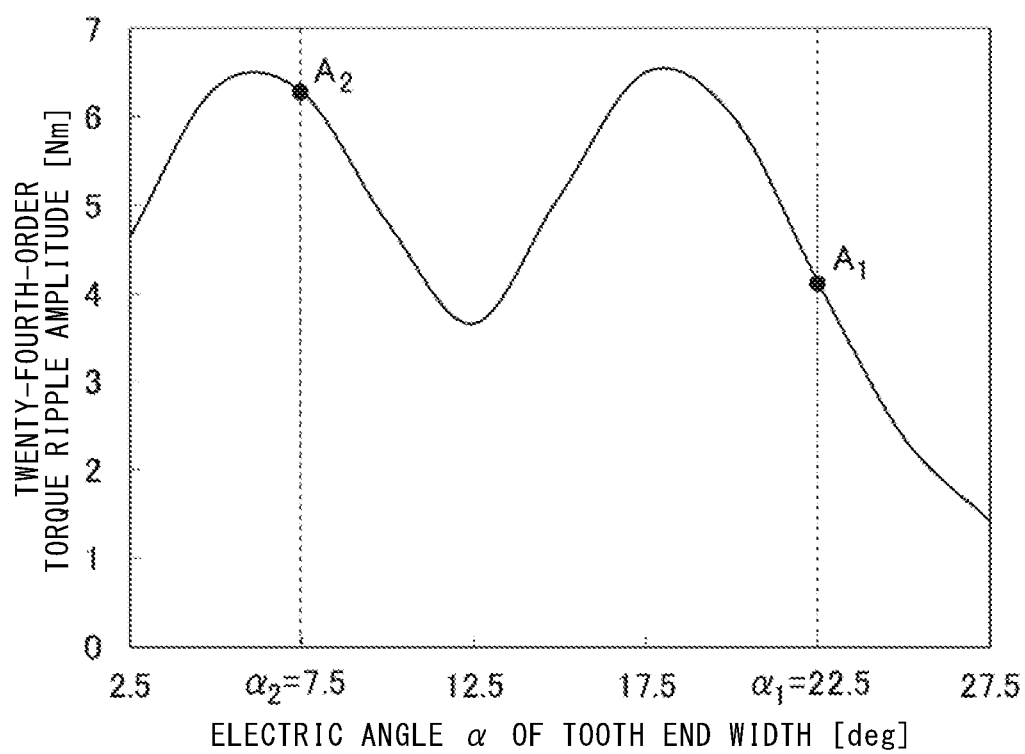
FIG. 22 shows change in the amplitude of twenty-fourth-order torque ripple with respect to a tooth end width α of the stator core when the axial-direction length of the stator core is L in a case of using a rotor of the rotary electric machine according to the fifth embodiment.
Figure 23:
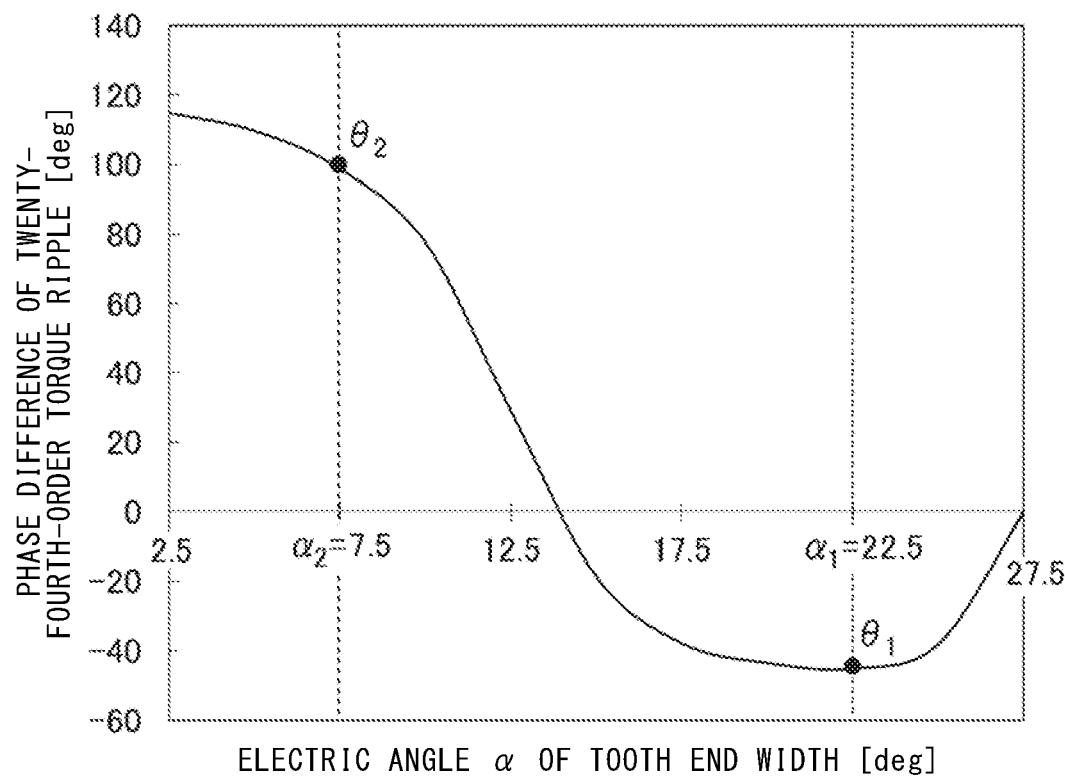
FIG. 23 shows change in a phase difference of twenty-fourth-order torque ripple where a phase when the electric angle of the tooth end width is 27.5 degrees is used as a reference, with respect to the tooth end width α of the stator core, when the axial-direction length of the stator core is L in a case of using the rotor of the rotary electric machine according to the fifth embodiment.
Figure 24:
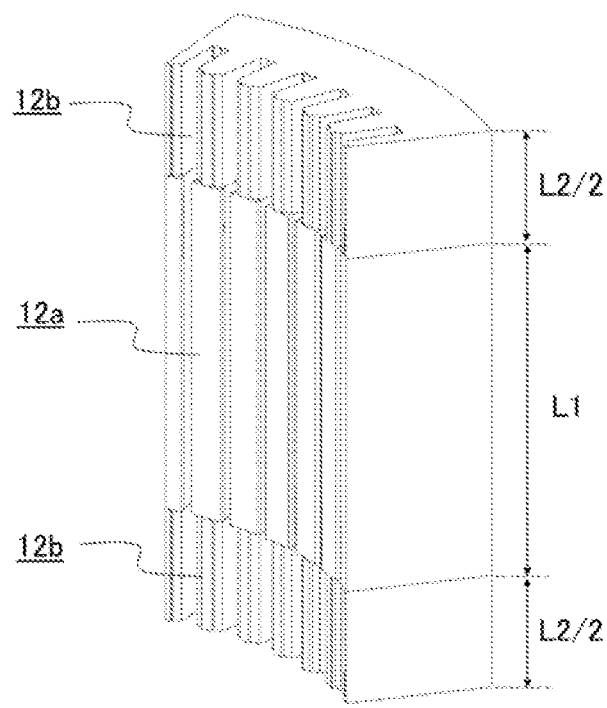
FIG. 24 is a perspective view of a cross-section of ⅛ part in a structure example of a stator of the rotary electric machine according to the fifth embodiment.

FIG. 20 is a sectional view along a direction perpendicular to the rotation axis in which the tooth end width of a stator core is α1, according to the fifth embodiment of the present disclosure. FIG. 21 is a sectional view along a direction perpendicular to the rotation axis in which the tooth end width of a stator core is α2, in a rotary electric machine according to the fifth embodiment. FIG. 22 shows change in the amplitude of twenty-fourth-order torque ripple with respect to the tooth end width in the rotary electric machine according to the fifth embodiment. FIG. 23 shows change in a phase difference of twenty-fourth-order torque ripple where a phase when the tooth end width is 27.5 degrees is used as a reference, with respect to the tooth end width, in the rotary electric machine according to the fifth embodiment. FIG. 24 is a perspective view of a cross-section of ⅛ part in a structure example of a stator of the rotary electric machine according to the fifth embodiment.

As shown in FIG. 20, the basic configuration of the rotary electric machine of the present embodiment in which the tooth end width of the stator core 12a is α1 is the same as that in FIG. 14, and α1=22.5 degrees. As shown in FIG. 21, the basic configuration of the rotary electric machine of the present embodiment in which the tooth end width of the stator core 12b is α2 is the same as that in FIG. 15, but α2 is 7.5 degrees. Although not shown, the configuration of the rotor of the present embodiment is the same as that in FIG. 16, but β1 is 60.0 degrees and β2 is 135.0 degrees.

From FIG. 22 and FIG. 23, it is found that, when the tooth end width α is changed, the amplitude and the phase of twenty-fourth-order torque ripple are changed, as in the first embodiment. In addition, θ1 is −45.2 degrees, θ2 is 98.3 degrees, θ2−θ1 is 143.5 degrees, which is not less than 90 degrees and not greater than 180 degrees. Therefore, twenty-fourth-order torque ripple can be reduced. The twenty-fourth-order torque ripple H occurring in the rotary electric machine is represented by (Expression 1), as in the first embodiment. Here, n is 2 and t is the electric angle of the rotation angle.

The values of L1 and L2 that minimize H are values when L1/L2 which is the ratio of L1 and L2 is about 1.5.

As shown in FIG. 24, the rotary electric machine according to the present embodiment includes the stator core 12a having the rotation-axis-direction length L1 and the stator core 12b having the rotation-axis-direction length L2, and L1 and L2 are set such that L1/L2 is about 1.5. The way of stacking the stator cores is the same as that in FIG. 8.

In this configuration, two kinds of stator cores having different tooth end widths α are combined in the axial direction with L1/L2 set at about 1.5, whereby twenty-fourth-order torque ripple can be suppressed. Since the stator core having combination of the stator core 12a and the stator core 12b is formed symmetrically in the rotation-axis direction, magnetic attraction forces acting on the entire rotor can be made symmetric in terms of rotation-axis-direction positions and thus can be balanced. Thus, a force acting in the axial direction of the rotor is reduced, whereby vibration and bearing damage can be prevented.

The same effects are obtained even if the number of stator cores divided in the rotation-axis direction is changed as shown in FIG. 9. If cutouts are provided on the outer circumference of the rotor core as in the first embodiment, it is possible to suppress twelfth-order torque ripple and twenty-fourth-order torque ripple at the same time, as in the first embodiment.

If the stator cores are stacked such that the ratio of the stator core having a larger tooth end width α, of the two kinds of stator cores, is greater as in the second embodiment, it is possible to increase torque while reducing twenty-fourth-order torque ripple, as in the second embodiment.

If the stator cores are stacked asymmetrically in the rotation-axis direction as in the third embodiment, it is possible to decrease the number of stator cores and improve manufacturing performance, as in the third embodiment.

Sixth Embodiment

[Single-V-Shaped Slots, Two Kinds of Stator Cores, Phase Difference=180 Degrees]

Figure 25:
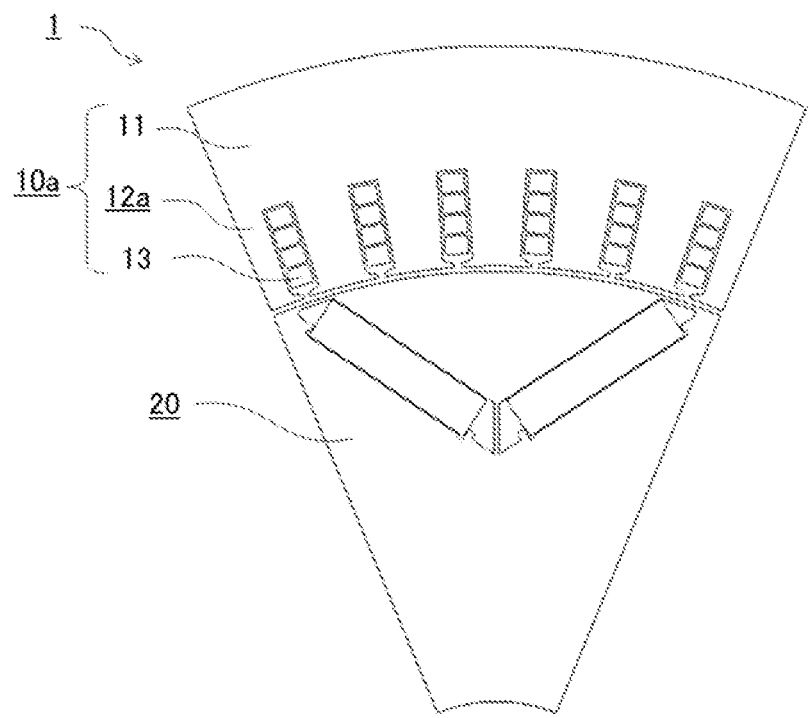
FIG. 25 is a sectional view along a direction perpendicular to the rotation axis of a rotary electric machine in which the tooth end width of a stator core is α1, according to the sixth embodiment of the present disclosure.
Figure 26:
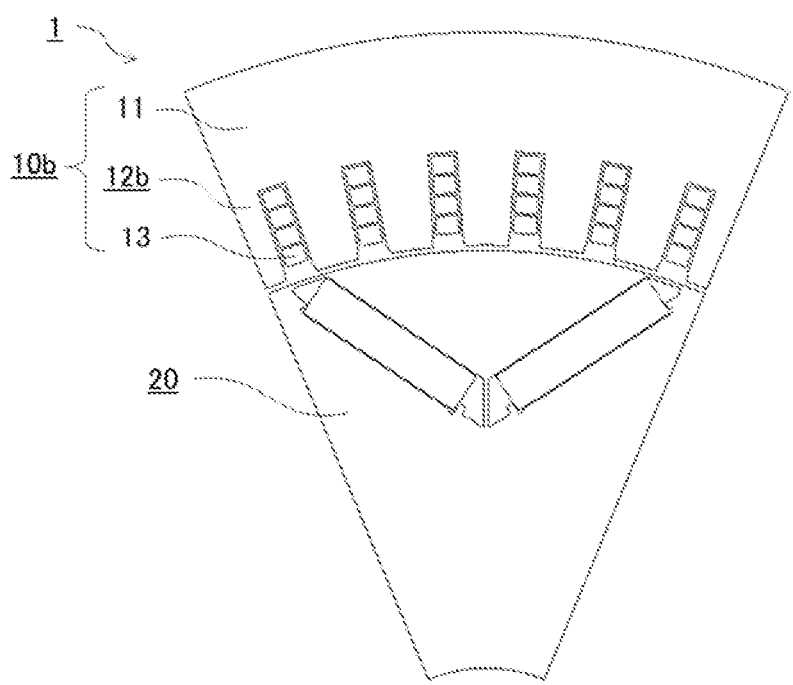
FIG. 26 is a sectional view along a direction perpendicular to the rotation axis of the rotary electric machine in which the tooth end width of a stator core is α2, according to the sixth embodiment.
Figure 27:
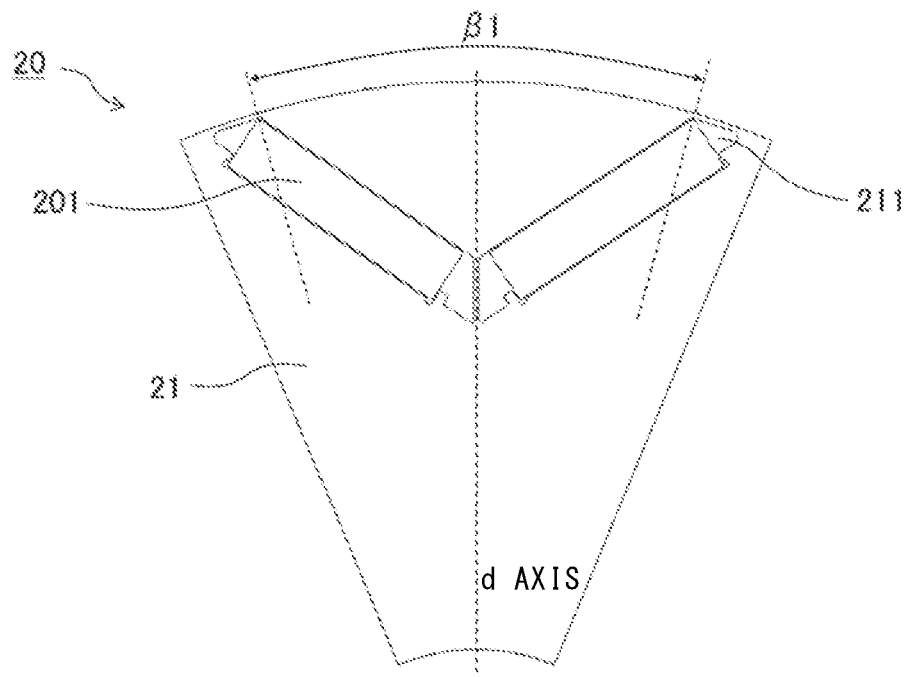
FIG. 27 is a sectional view along a direction perpendicular to the rotation axis of a rotor of the rotary electric machine according to the sixth embodiment.
Figure 28:
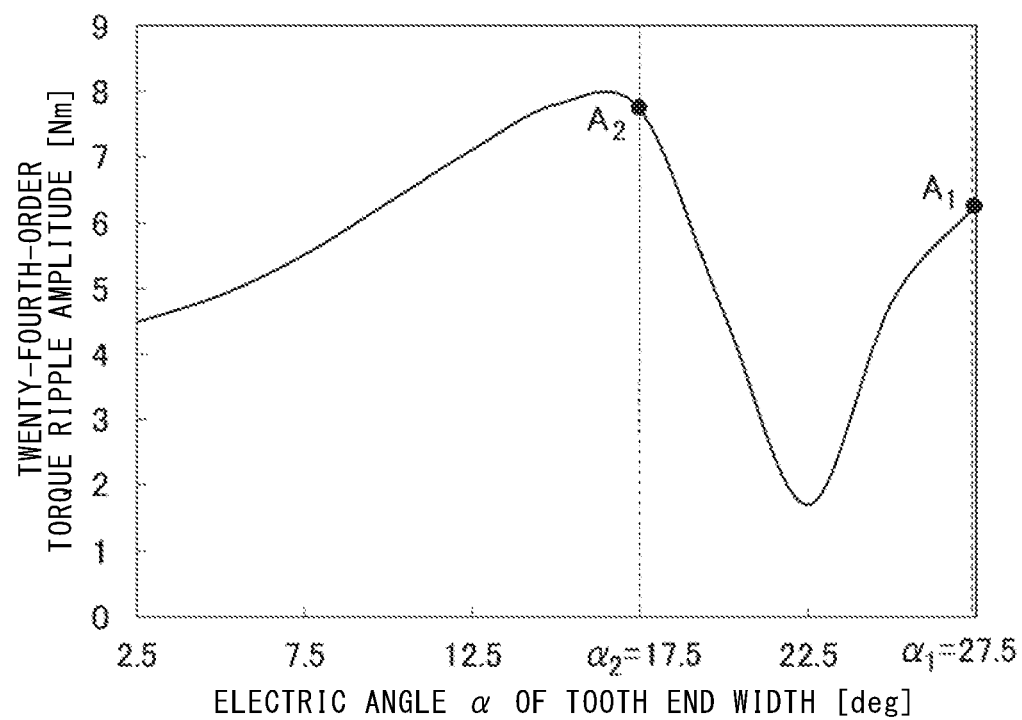
FIG. 28 shows change in the amplitude of twenty-fourth-order torque ripple with respect to a tooth end width α of the stator core when the axial-direction length of the stator core is L in a case of using the rotor of the rotary electric machine according to the sixth embodiment.
Figure 29:
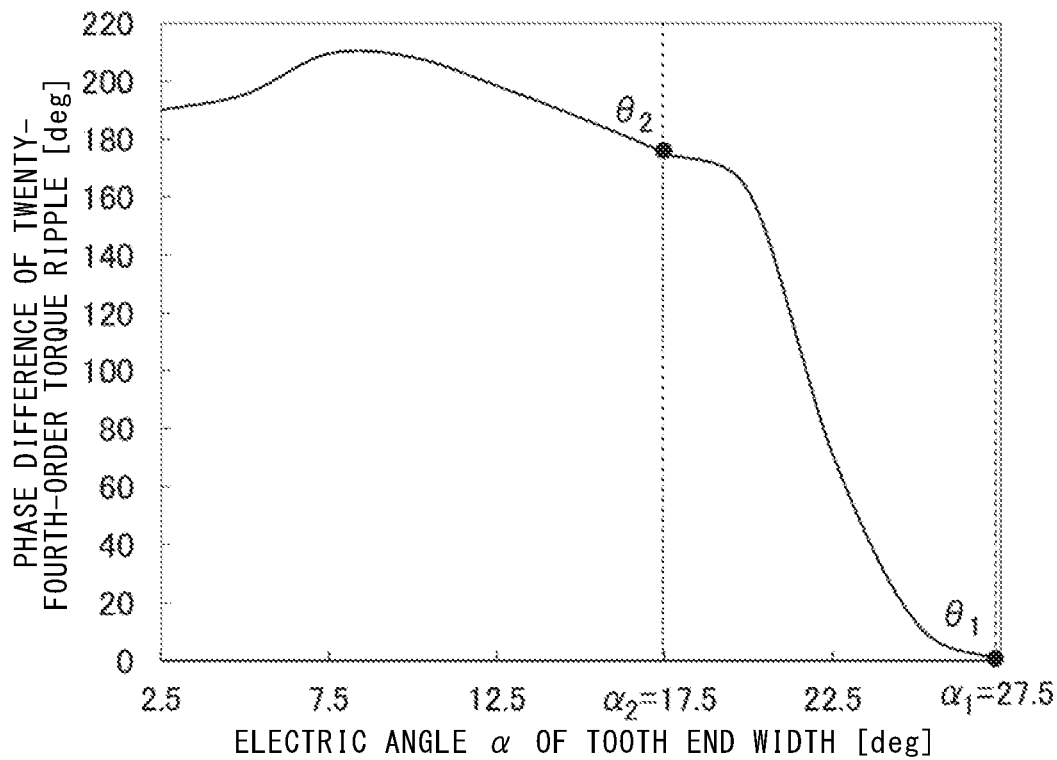
FIG. 29 shows change in a phase difference of twenty-fourth-order torque ripple where a phase when the electric angle of the tooth end width is 27.5 degrees is used as a reference, with respect to the tooth end width α of the stator core, when the axial-direction length of the stator core is L in a case of using the rotor of the rotary electric machine according to the sixth embodiment.
Figure 30:
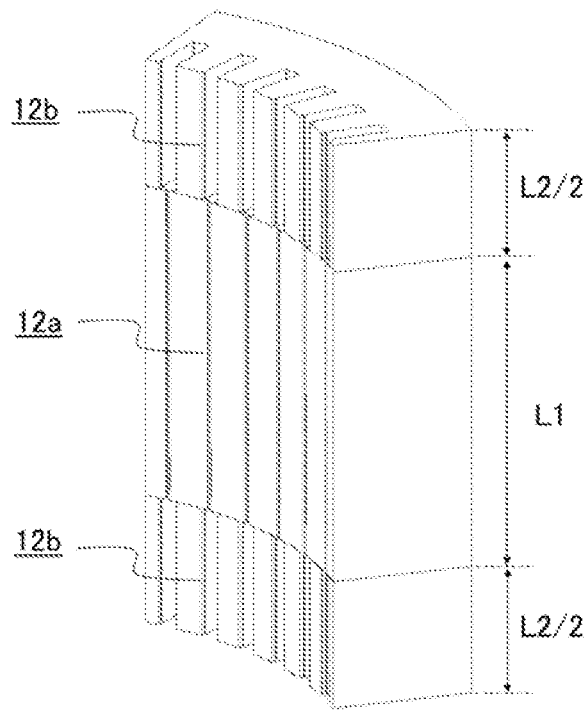
FIG. 30 is a perspective view of a cross-section of ⅛ part in a structure example of a stator of the rotary electric machine according to the sixth embodiment.

FIG. 25 is a sectional view along a direction perpendicular to the rotation axis in which the tooth end width of a stator core is α1, according to the sixth embodiment of the present disclosure. FIG. 26 is a sectional view along a direction perpendicular to the rotation axis in which the tooth end width of a stator core is α2, according to the sixth embodiment. FIG. 27 is a sectional view along a direction perpendicular to the rotation axis of a rotary electric machine according to the sixth embodiment. FIG. 28 shows change in the amplitude of twenty-fourth-order torque ripple with respect to the tooth end width α of the stator core when the axial-direction length of the stator core is L in a case of using a rotor of the rotary electric machine according to the sixth embodiment. FIG. 29 shows change in a phase difference of twenty-fourth-order torque ripple where a phase when the electric angle of the tooth end width is 27.5 degrees is used as a reference, with respect to the tooth end width α of the stator core, when the axial-direction length of the stator core is L in a case of using the rotor of the rotary electric machine according to the sixth embodiment. FIG. 30 shows, by a perspective view, a cross-section of ⅛ part in a structure example of a stator of the rotary electric machine according to the sixth embodiment.

As shown in FIG. 25, the basic configuration of the rotary electric machine of the present embodiment in which the tooth end width of the stator core 12a is α1 is the same as that in FIG. 14, and α1 is 27.5 degrees. As shown in FIG. 26, the basic configuration of the rotary electric machine of the present embodiment in which the tooth end width of the stator core 12b is α2 is the same as that in FIG. 15, but α2 is 17.5 degrees.

As shown in FIG. 27, the rotor 20 has an annular rotor core 21, and has a pair of magnet slots 211 arranged in a V shape and opposed to each other such that the distance therebetween is narrowed toward the radially inner side while being centered at the d axis of the rotor core 21. A pair of magnets 201 are inserted in the pair of magnet slots 211. The pair of magnets 201 have flat plate shapes, are oriented along short sides, and are magnetized so as to be all directed toward the same direction in the radial direction.

Eight sets of the magnets, each set being composed of the above two magnets, are equally arranged in the circumferential direction in the same manner such that the magnetization directions of the sets adjacent in the circumferential direction are alternately directed toward the inner side and the outer side in the radial direction. Here, in the cross-section perpendicular to the rotation axis, the pole arc angle which is the electric angle of an angle formed in the rotation direction of the rotor 20 by two lines connecting the rotation center of the rotor 20 and the rotor-surface-side corners of the magnets arranged inside the rotor 20, is denoted by β. Then, the pole arc angle of the magnets 201 is denoted by $1, and β1 is 130.0 degrees.

From FIG. 28 and FIG. 29, it is found that, when the tooth end width α is changed, the amplitude and the phase of twenty-fourth-order torque ripple are changed, as in the first embodiment. In addition, θ1 is 0.0 degrees, θ2 is 180.0 degrees, and θ2−θ1 is 180.0 degrees. Therefore, the axial-direction lengths L1 and L2 of the stator core 12a and the stator core 12b that minimize the twenty-fourth-order torque ripple H occurring in the rotary electric machine according to the sixth embodiment, are obtained from L1:L2=A2:A1, and L1/L2 which is the ratio of L1 and L2 is about 1.22.

As shown in FIG. 30, the rotary electric machine according to the present embodiment includes the stator core 12a having the rotation-axis-direction length L1 and the stator core 12b having the rotation-axis-direction length L2, and L1 and L2 are set such that L1/L2 is about 1.22. The way of stacking the stator cores is the same as that in FIG. 8.

In this configuration, two kinds of stator cores having different tooth end widths α are combined in the rotation-axis direction with L1/L2 set at about 1.22, whereby twenty-fourth-order torque ripple can be suppressed almost completely. Since the stator having combination of the stator core 12a and the stator core 12b is formed symmetrically in the axial direction, magnetic attraction forces acting on the entire rotor can be made symmetric in terms of rotation-axis-direction positions and thus can be balanced. Thus, a force acting in the axial direction of the rotor is reduced, whereby vibration and bearing damage can be prevented.

The same effects are obtained even if the number of stator cores divided in the rotation-axis direction is changed as shown in FIG. 9. If cutouts are provided on the outer circumference of the rotor core as in the first embodiment, it is possible to suppress twelfth-order torque ripple and twenty-fourth-order torque ripple at the same time.

If the stator cores are stacked such that the ratio of the stator core having a larger tooth end width α, of the two kinds of stator cores, is greater as in the second embodiment, it is possible to increase torque while reducing twenty-fourth-order torque ripple.

If the stator cores are stacked asymmetrically in the rotation-axis direction as in the third embodiment, it is possible to decrease the number of stator cores and improve manufacturing performance.

As in the fifth embodiment, if the two kinds of stator cores are combined such that the phase difference of twenty-fourth-order torque ripples occurring in the two kinds of stator cores is not less than 90 degrees and not greater than 180 degrees, it is possible to reduce twenty-fourth-order torque ripple.

Seventh Embodiment

[Triple-V-Shaped Slots, Two Kinds of Stator Cores, Phase Difference=180 Degrees]

Figure 31:
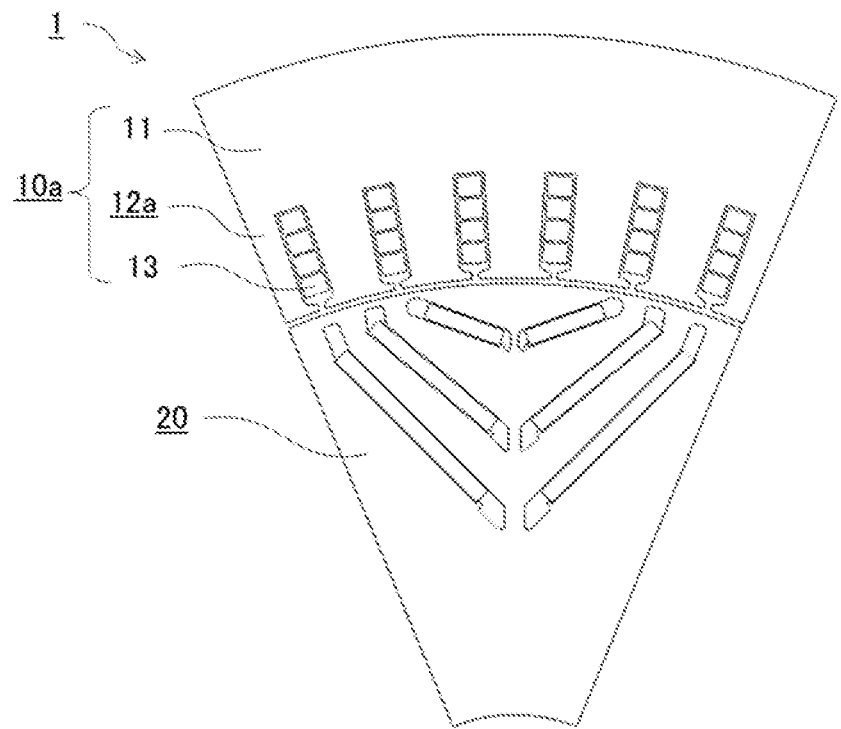
FIG. 31 is a sectional view along a direction perpendicular to the rotation axis of a rotary electric machine in which the tooth end width of a stator core is α1, according to the seventh embodiment of the present disclosure.
Figure 32:
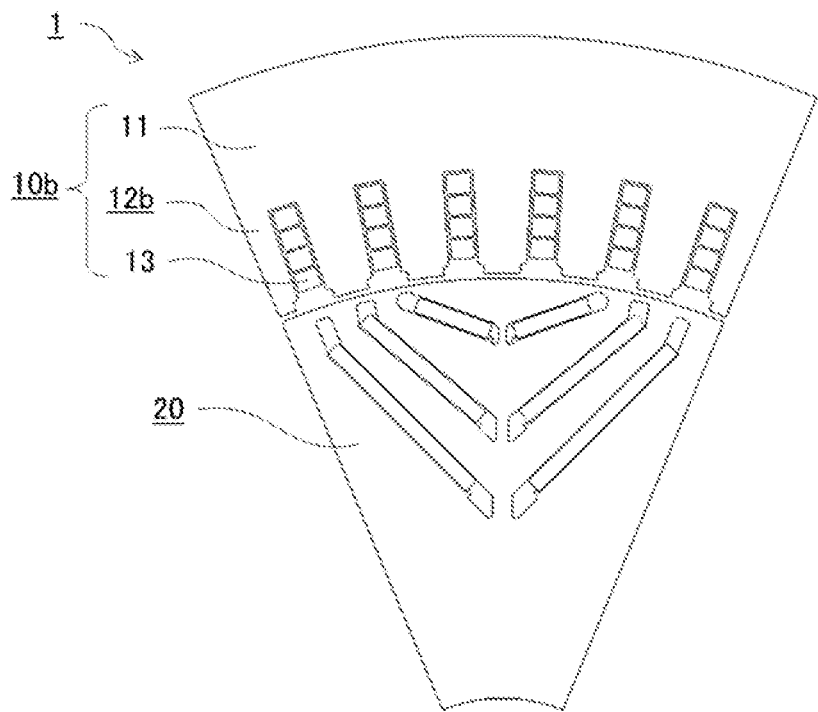
FIG. 32 is a sectional view along a direction perpendicular to the rotation axis of the rotary electric machine in which the tooth end width of a stator core is α2, according to the seventh embodiment.
Figure 33:
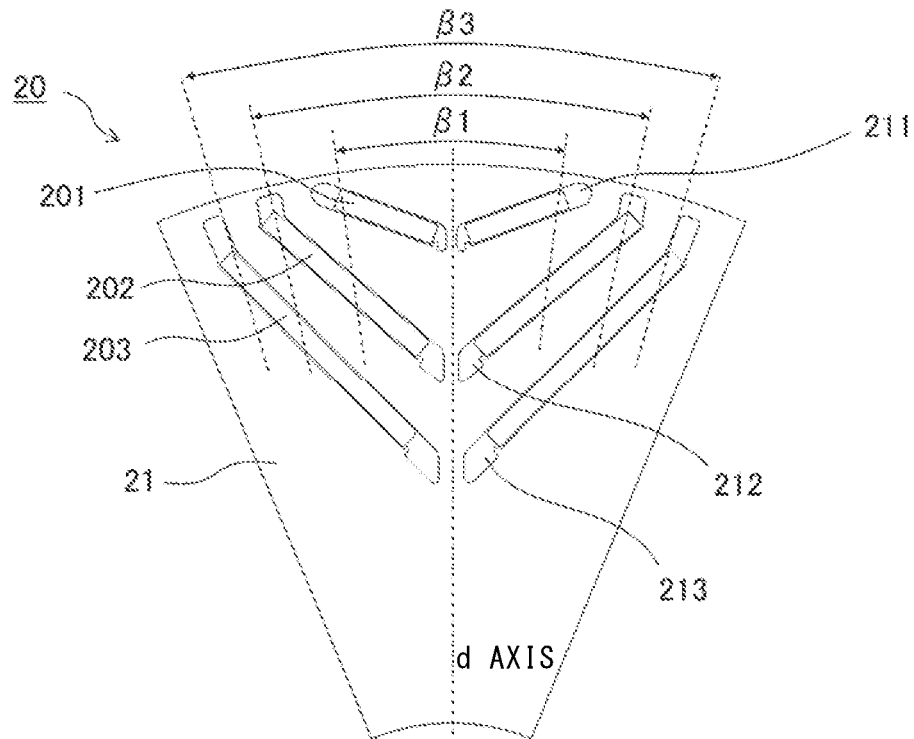
FIG. 33 is a sectional view along a direction perpendicular to the rotation axis of a rotor of the rotary electric machine according to the seventh embodiment.
Figure 34:
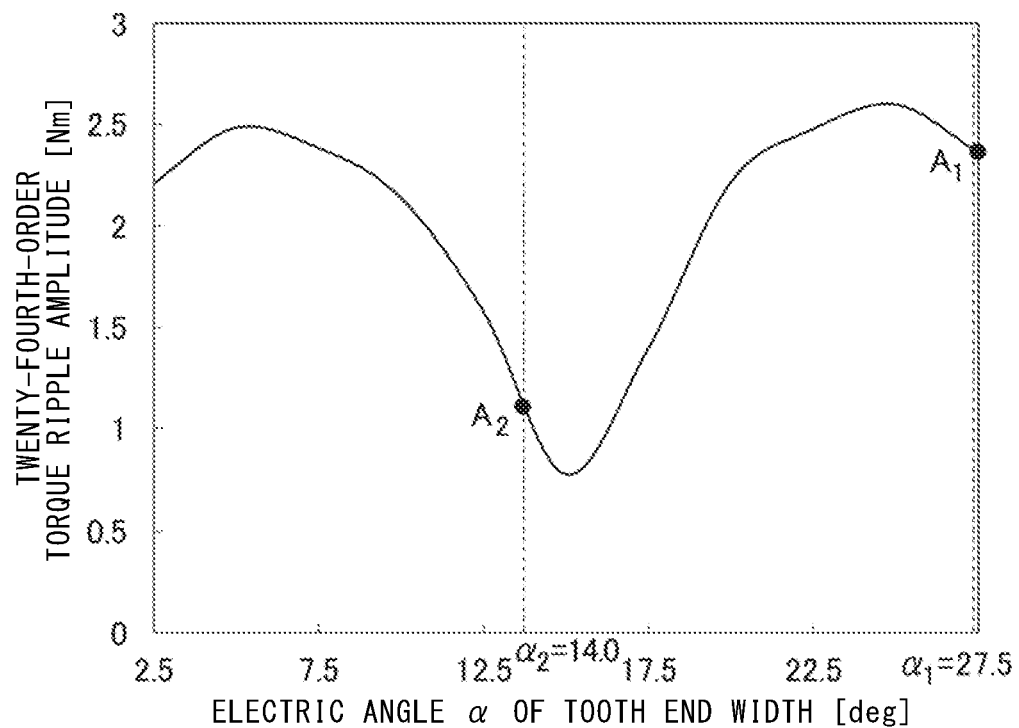
FIG. 34 shows change in the amplitude of twenty-fourth-order torque ripple with respect to a tooth end width a of the stator core when the axial-direction length of the stator core is L in a case of using the rotor of the rotary electric machine according to the seventh embodiment.
Figure 35:
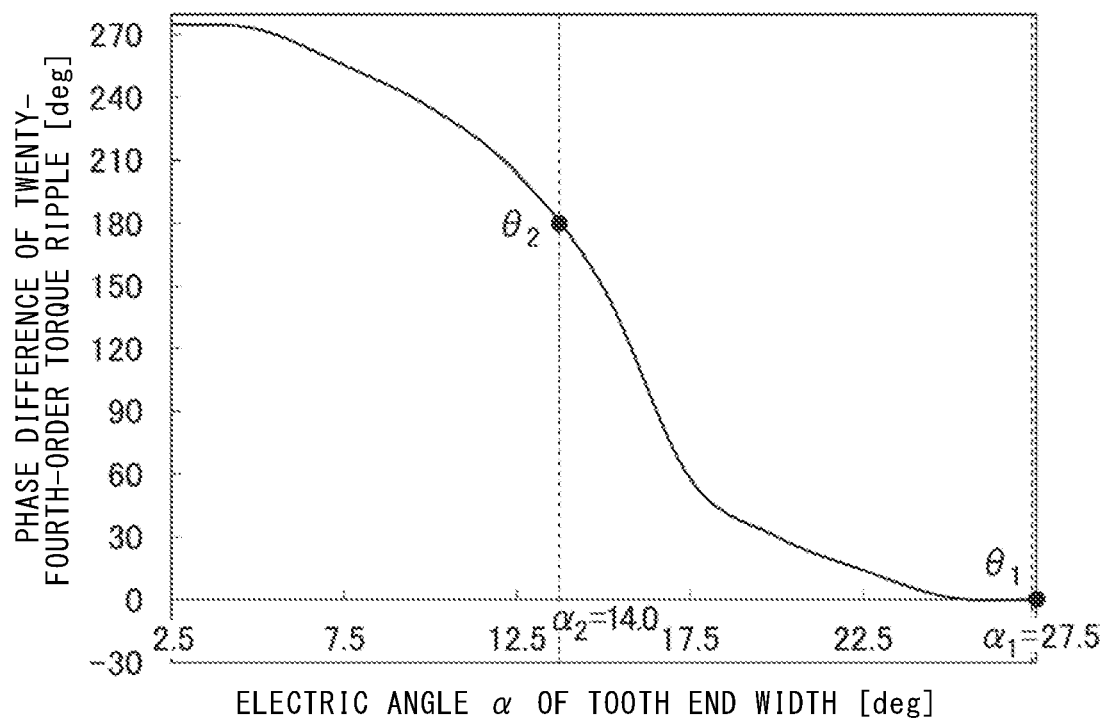
FIG. 35 shows change in a phase difference of twenty-fourth-order torque ripple where a phase when the electric angle of the tooth end width is 27.5 degrees is used as a reference, with respect to the tooth end width α of the stator core, when the axial-direction length of the stator core is L in a case of using the rotor of the rotary electric machine according to the seventh embodiment.
Figure 36:
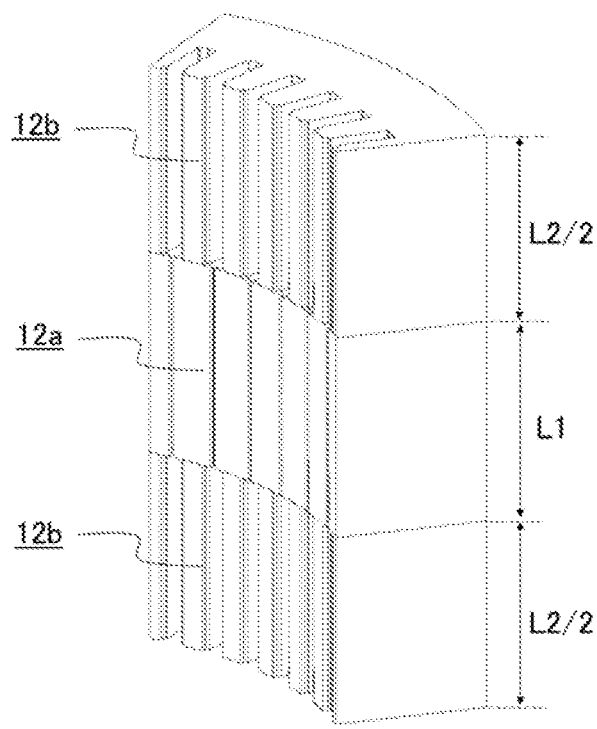
FIG. 36 is a perspective view of a cross-section of ⅛ part in a structure example of a stator of the rotary electric machine according to the seventh embodiment.

FIG. 31 is a sectional view along a direction perpendicular to the rotation axis in which the tooth end width of a stator core is α1, according to the seventh embodiment of the present disclosure. FIG. 32 is a sectional view along a direction perpendicular to the rotation axis in which the tooth end width of a stator core is α2, according to the seventh embodiment. FIG. 33 is a sectional view along a direction perpendicular to the rotation axis of a rotor of a rotary electric machine according to the seventh embodiment. FIG. 34 shows change in the amplitude of twenty-fourth-order torque ripple with respect to the tooth end width α of the stator core when the axial-direction length of the stator core is L in a case of using the rotor of the rotary electric machine according to the seventh embodiment. FIG. 35 shows change in a phase difference of twenty-fourth-order torque ripple where a phase when the electric angle of the tooth end width is 27.5 degrees is used as a reference, with respect to the tooth end width α of the stator core, when the axial-direction length of the stator core is L in a case of using the rotor of the rotary electric machine according to the seventh embodiment. FIG. 36 is a perspective view of a cross-section of ⅛ part in a structure example of a stator of the rotary electric machine according to the seventh embodiment.

As shown in FIG. 31, the basic configuration of the rotary electric machine of the present embodiment in which the tooth end width of the stator core 12a is α1 is the same as that in FIG. 14, and α1 is 27.5 degrees.

As shown in FIG. 32, the basic configuration of the rotary electric machine of the seventh embodiment in which the tooth end width of the stator core 12b is α2 is the same as that in FIG. 15, but α2 is 14.0 degrees.

As shown in FIG. 33, the rotor 20 has an annular rotor core 21, and has a pair of first-layer magnet slots 211, a pair of second-layer magnet slots 212, and a pair of third-layer magnet slots 213, each pair of slots being arranged in a V shape and opposed to each other such that the distance therebetween is narrowed toward the radially inner side while being centered at the d axis of the rotor core 21. A pair of first-layer magnets 2θ1, a pair of second-layer magnets 2θ2, and a pair of third-layer magnets 203 are inserted in the pair of first-layer magnet slots 211, the pair of second-layer magnet slots 212, and the pair of third-layer magnet slots 213, respectively. The pair of first-layer magnets 2θ1, the pair of second-layer magnets 2θ2, and the pair of third-layer magnets 203 have flat plate shapes, are oriented along short sides, and are magnetized so as to be all directed toward the same direction in the radial direction.

Eight sets of the magnets, each set being composed of the above six magnets, are equally arranged in the circumferential direction in the same manner such that the magnetization directions of the sets adjacent in the circumferential direction are alternately directed toward the inner side and the outer side in the radial direction. Here, in the cross-section perpendicular to the rotation axis, the pole arc angle which is the electric angle of an angle formed in the rotation direction of the rotor 20 by two lines connecting the rotation center of the rotor 20 and the rotor-surface-side corners of the magnets arranged inside the rotor 20, is denoted by β. Then, the pole arc angle of the first-layer magnets 2θ1 is denoted by β1, the pole arc angle of the second-layer magnets 2θ2 is denoted by β2, the pole arc angle of the third-layer magnets 203 is denoted by β3, β1 is 76.0 degrees, β2 is 104.0 degrees, and β3 is 140.0 degrees.

From FIG. 34 and FIG. 35, it is found that, when the tooth end width α is changed, the amplitude and the phase of twenty-fourth-order torque ripple are changed, as in the first embodiment. In addition, θ1 is 0.0 degrees, θ2 is 180.0 degrees, and θ2-θ1 is 180.0 degrees. Therefore, the rotation-axis-direction lengths L1 and L2 of the stator core 12a and the stator core 12b that minimize the twenty-fourth-order torque ripple H occurring in the rotary electric machine according to the present embodiment, are obtained from L1:L2=A2:A1, and L1/L2 which is the ratio of L1 and L2 is about 0.54.

As shown in FIG. 36, the rotary electric machine according to the present embodiment includes the stator core 12a having the rotation-axis-direction length L1 and the stator core 12b having the rotation-axis-direction length L2, and L1 and L2 are set such that L1/L2 is about 0.54. The way of stacking the stator cores is the same as that in FIG. 8. In this configuration, two kinds of stator cores having different tooth end widths α are combined in the rotation-axis direction with L1/L2 set at about 0.54, whereby twenty-fourth-order torque ripple can be suppressed almost completely.

Since the stator having combination of the stator core 12a and the stator core 12b is formed symmetrically in the rotation-axis direction, magnetic attraction forces acting on the entire rotor can be made symmetric in terms of rotation-axis-direction positions and thus can be balanced. Thus, a force acting in the axial direction of the rotor is reduced, whereby vibration and bearing damage can be prevented.

The same effects are obtained even if the number of stator cores divided in the rotation-axis direction is changed as shown in FIG. 9.

In the rotary electric machine of the present embodiment, if cutouts are provided on the outer circumference of the rotor core as in the first embodiment, it is possible to suppress twelfth-order torque ripple and twenty-fourth-order torque ripple at the same time, as in the first embodiment.

In the rotary electric machine of the present embodiment, if the stator cores are stacked such that the ratio of the stator core having a larger tooth end width α, of the two kinds of stator cores, is greater as in the second embodiment, it is possible to increase torque while reducing twenty-fourth-order torque ripple.

If the stator cores are stacked asymmetrically in the rotation-axis direction as in the third embodiment, it is possible to decrease the number of stator cores and improve manufacturing performance.

As in the fifth embodiment, if the two kinds of stator cores are combined such that the phase difference of twenty-fourth-order torque ripples occurring in the two kinds of stator cores is not less than 90 degrees and not greater than 180 degrees, it is possible to reduce twenty-fourth-order torque ripple.

Eighth Embodiment

[Double-V-Shaped Slots ($\beta_1$=50 Degrees, $\beta_2$=130 Degrees), Two Kinds of Stator Cores]

Figure 37:
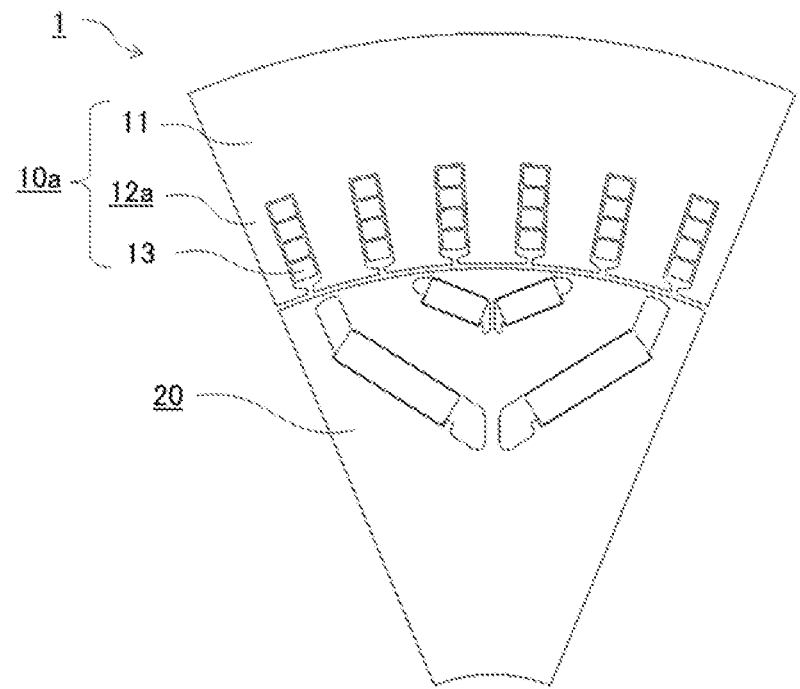
FIG. 37 is a sectional view along a direction perpendicular to the rotation axis of a rotary electric machine in which the tooth end width of a stator core is α1, according to the eighth embodiment of the present disclosure.
Figure 38:
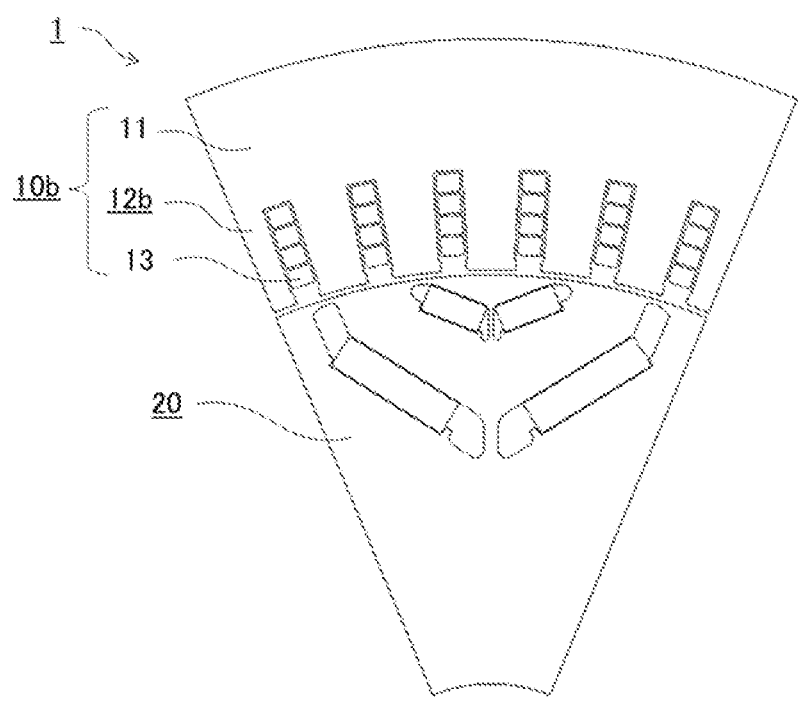
FIG. 38 is a sectional view along a direction perpendicular to the rotation axis of the rotary electric machine in which the tooth end width of a stator core is α2, according to the eighth embodiment.
Figure 39:
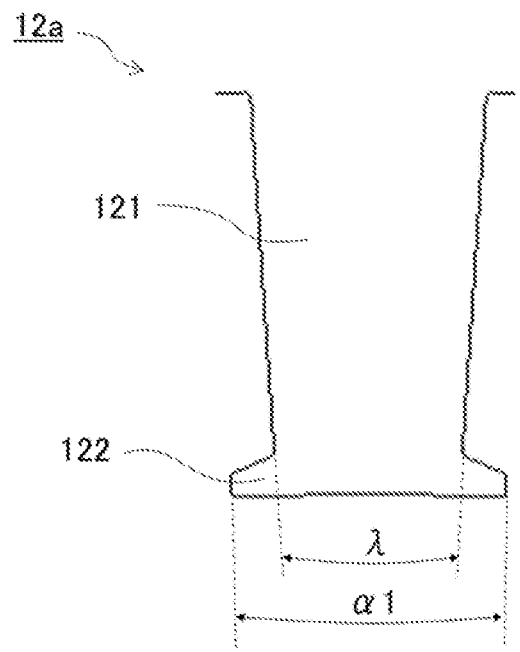
FIG. 39 is an enlarged view of tooth part in FIG. 37.
Figure 40:
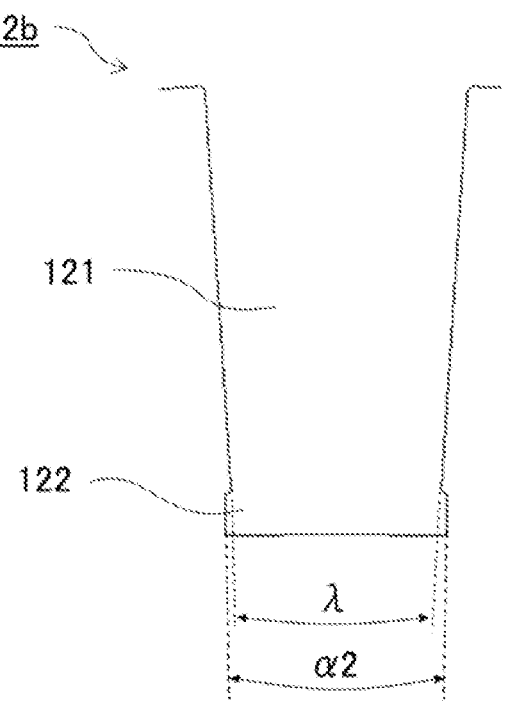
FIG. 40 is an enlarged view of tooth part in FIG. 38.
Figure 41:
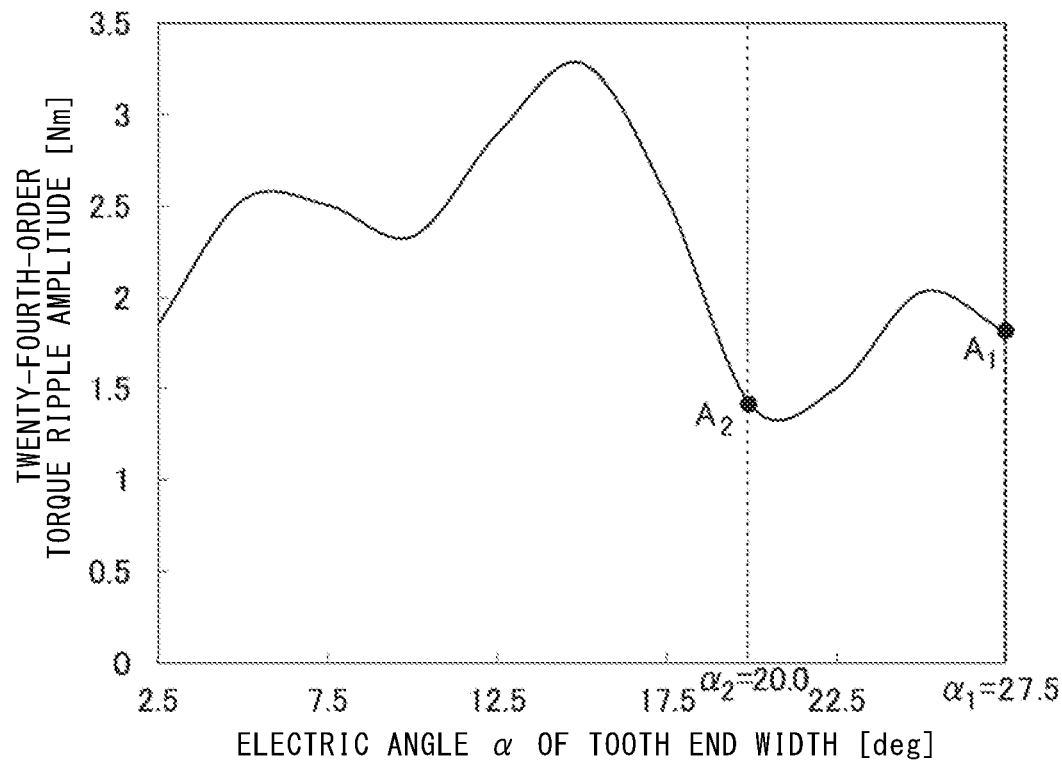
FIG. 41 shows change in the amplitude of twenty-fourth-order torque ripple with respect to a tooth end width α of the stator core when the axial-direction length of the stator core is L in a case of using a rotor of the rotary electric machine according to the eighth embodiment.
Figure 42:
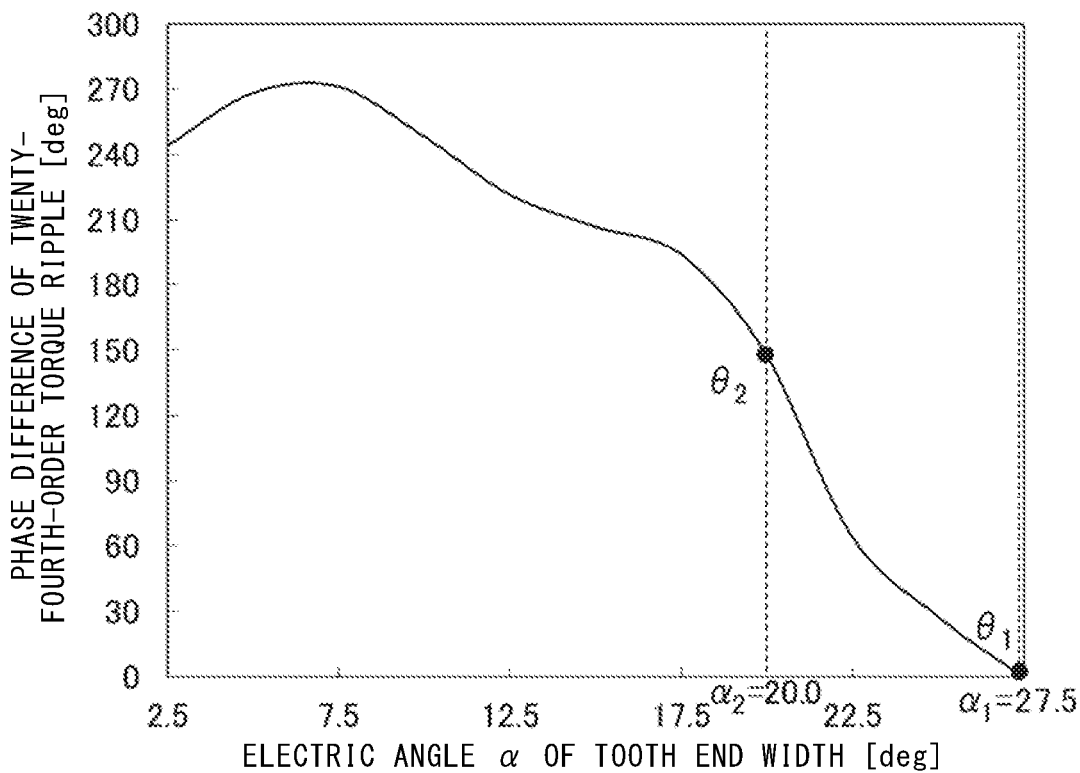
FIG. 42 shows change in a phase difference of twenty-fourth-order torque ripple where a phase when the electric angle of the tooth end width is 27.5 degrees is used as a reference, with respect to the tooth end width α of the stator core, when the axial-direction length of the stator core is L in a case of using the rotor of the rotary electric machine according to the eighth embodiment.
Figure 43:
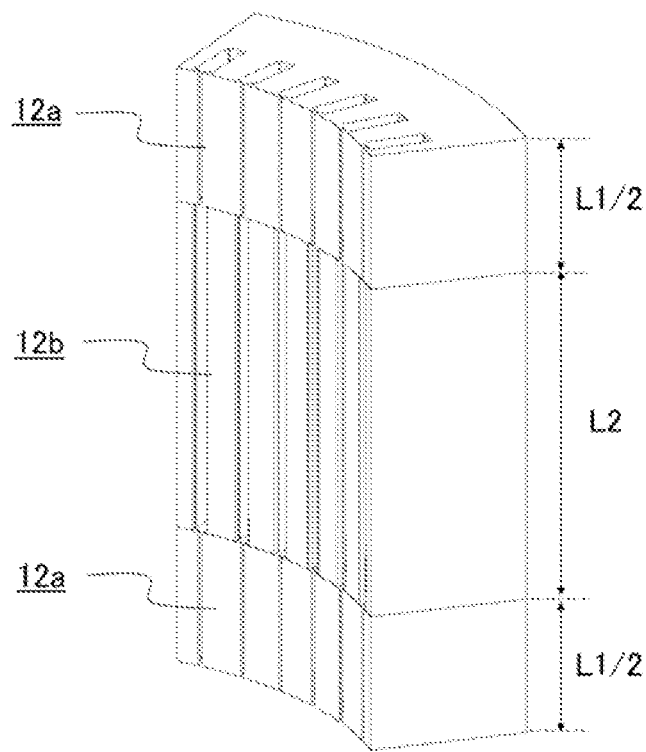
FIG. 43 is a perspective view of a cross-section of ⅛ part in a structure example of a stator of the rotary electric machine according to the eighth embodiment.
Figure 44:
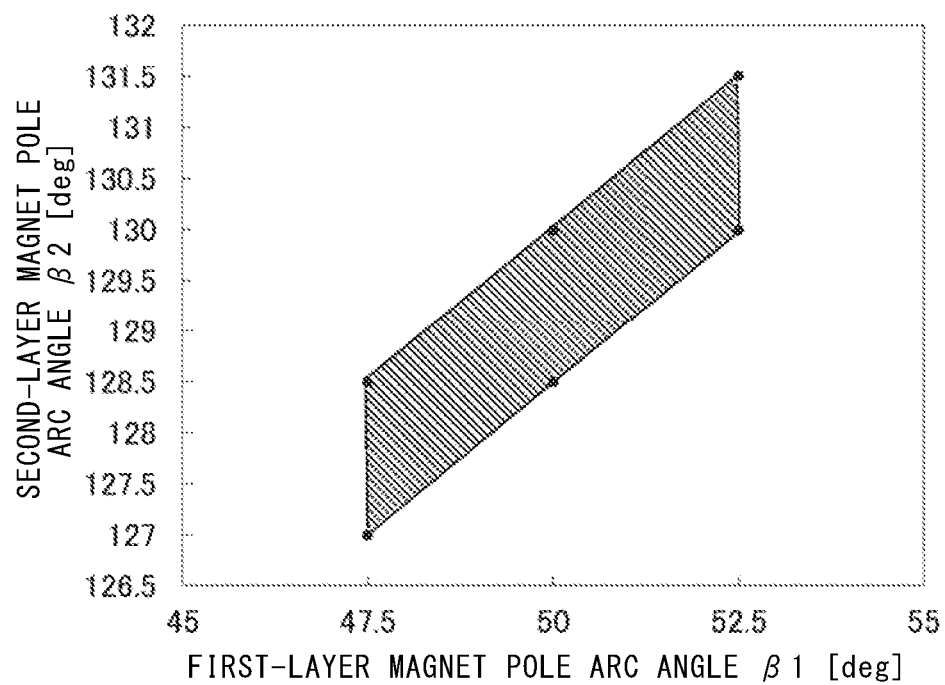
FIG. 44 shows such combination of magnet pole arc angles that the phase of twenty-fourth-order torque ripple changes by 90 degrees or more when the tooth end width α of the stator core is changed in a range of $19.0 \leq \alpha \leq 27.5$, in the rotary electric machine according to the eighth embodiment.

FIG. 37 is a sectional view along a direction perpendicular to the rotation axis of a rotary electric machine in which the tooth end width of a stator core is $\alpha_1$, according to the eighth embodiment of the present disclosure. FIG. 38 is a sectional view along a direction perpendicular to the rotation axis of the rotary electric machine in which the tooth end width of a stator core is $\alpha_2$, according to the eighth embodiment. FIG. 39 and FIG. 40 are enlarged views of tooth parts in FIG. 37 and FIG. 38. FIG. 41 shows change in the amplitude of twenty-fourth-order torque ripple with respect to the tooth end width $\alpha$ of the stator core when the axial-direction length of the stator core is L in a case of using a rotor of the rotary electric machine according to the eighth embodiment. FIG. 42 shows change in a phase difference of twenty-fourth-order torque ripple where a phase when the electric angle of the tooth end width is 27.5 degrees is used as a reference, with respect to the tooth end width $\alpha$ of the stator core, when the axial-direction length of the stator core is L in a case of using the rotor of the rotary electric machine according to the eighth embodiment. FIG. 43 shows, by a perspective view, a cross-section of ⅛ part in a structure example of a stator of the rotary electric machine according to the eighth embodiment. FIG. 44 shows such combination of magnet pole arc angles that the phase of twenty-fourth-order torque ripple changes by 90 degrees or more when the tooth end width $\alpha$ of the stator core is changed in a range of $19.0 \leq \alpha \leq 27.5$, in the rotary electric machine according to the eighth embodiment.

As shown in FIG. 37 and FIG. 39, the basic configuration of the rotary electric machine according to the present embodiment in which the tooth end width of the stator core 12a is $\alpha_1$ is the same as that in FIG. 14, and $\alpha_1$ is 27.5 degrees. As shown in FIG. 38 and FIG. 40, the basic configuration of the rotary electric machine according to the present embodiment in which the tooth end width of the stator core 12b is $\alpha_2$ is the same as that in FIG. 14, but $\alpha_2$ is 20.0 degrees.

As described above, in the present embodiment, the tooth end widths of the tooth end portions 122 satisfy $\alpha_1 > \alpha_2 \geq \lambda$. Although not shown, the configuration of the rotor 20 of the present embodiment is the same as that in FIG. 16, but $\beta_1$ is 50.0 degrees and $\beta_2$ is 130.0 degrees.

In addition, $\theta_1$ is 0.0 degrees, $\theta_2$ is 147.6 degrees, and $\theta_2 - \theta_1$ is 147.6 degrees, which is not less than 90 degrees and not greater than 180 degrees. Therefore, twenty-fourth-order torque ripple can be reduced. The twenty-fourth-order torque ripple H occurring in the rotary electric machine is represented by (Expression 1), as in the first embodiment. Here, n is 2 and t is the electric angle of the rotation angle.

In addition, the values of L1 and L2 that minimize H are values when L1/L2 which is the ratio of L1 and L2 is about 0.82.

As shown in FIG. 43, the rotary electric machine according to the present embodiment includes the stator core 12a having the rotation-axis-direction length L1 and the stator core 12b having the rotation-axis-direction length L2, and L1/L2 is about 0.82. The way of stacking the stator cores is the same as that in FIG. 8.

In this configuration, two kinds of stator cores having different tooth end widths $\alpha$ are combined in the rotation-axis direction with L1/L2 set at about 0.82, whereby twenty-fourth-order torque ripple can be suppressed. Since the stator having combination of the stator core 12a and the stator core 12b is formed symmetrically in the rotation-axis direction, magnetic attraction forces acting on the entire rotor can be made symmetric in terms of rotation-axis-direction positions and thus can be balanced. Thus, a force acting in the axial direction of the rotor is reduced, whereby vibration and bearing damage can be prevented.

The same effects are obtained even if the number of stator cores divided in the rotation-axis direction is changed as shown in FIG. 9. If cutouts are provided on the outer circumference of the rotor core as in the first embodiment, it is possible to suppress twelfth-order torque ripple and twenty-fourth-order torque ripple at the same time.

If the stator cores are stacked such that the ratio of the stator core having a larger tooth end width $\alpha$, of the two kinds of stator cores, is greater as in the second embodiment, it is possible to increase torque while reducing twenty-fourth-order torque ripple.

If the stator cores are stacked asymmetrically in the rotation-axis direction as in the third embodiment, it is possible to decrease the number of stator cores and improve manufacturing performance, as in the third embodiment.

Instead of using a structure in which the stator core having brims extending in the circumferential direction at the tooth end portion and the stator core in which the tooth end portion is cut are combined as in the above-described embodiments, a plurality of kinds of stator cores having brims at the tooth end portions are combined. Also in this case, in order to obtain the same effects as those in the above-described embodiments, the structure of the magnets arranged in two layers in the rotor and the magnet pole arc angles in the respective layers are optimized.

As shown in FIG. 44, when the tooth end width $\alpha$ is changed in a range of $19.0 \leq \alpha \leq 27.5$ corresponding to the end width in a case of having brims, the phase of twenty-fourth-order torque ripple changes by 90 degrees or more, under the condition of the following expression which represents combination of magnet pole arc angles in a hatched area.

[Mathematical 2]

$$\gamma_2 = 0.6\beta_1 + C \quad (47.55 \leq \beta_1 \leq 52.5, 98.55 \leq C \leq 100.0) \quad \text{(Expression 2)}$$

Here, C is a real number in a range of $98.5 \leq C \leq 100.0$.

Thus, as in the present embodiment, while a plurality of kinds of stator cores having brims at the tooth end portions are combined, the magnet pole arc angles in the rotor structure in which magnets are arranged in two layers are set as shown by (Expression 2), whereby twenty-fourth-order torque ripple can be suppressed as in the fifth embodiment.

That is, when a plurality of kinds of stator cores of which the tooth end shapes have brims extending in the circumferential direction are combined, phase change in torque ripple occurring in each stator core can be increased, whereby torque ripple can be effectively suppressed.

Ninth Embodiment

[Double-V-Shaped Slots, Three Kinds of Stator Cores, Phase Difference=120 Degrees]

Figure 45:
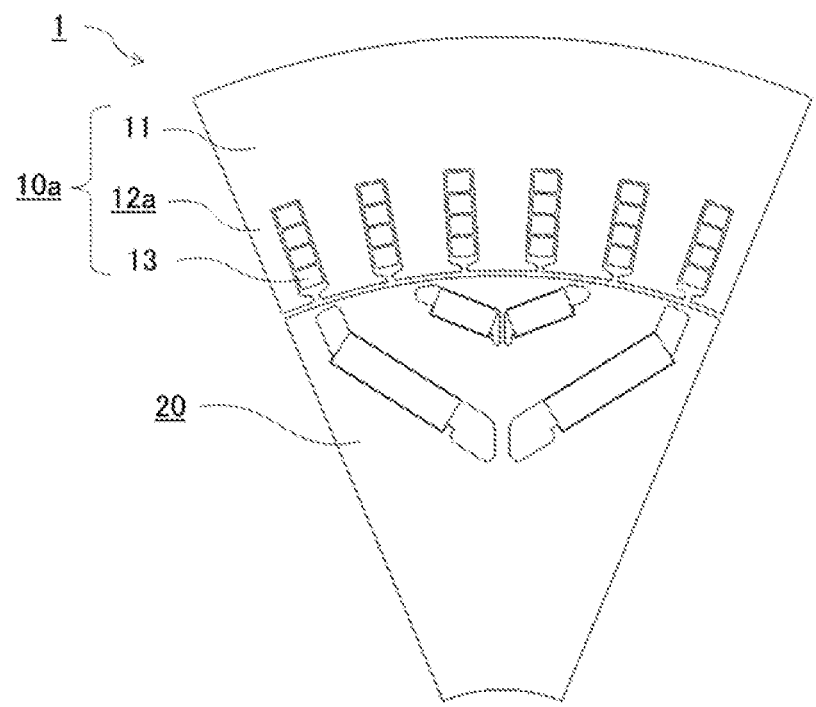
FIG. 45 is a sectional view along a direction perpendicular to the rotation axis of a rotary electric machine in which the tooth end width of a stator core is α1, according to the ninth embodiment of the present disclosure.
Figure 46:
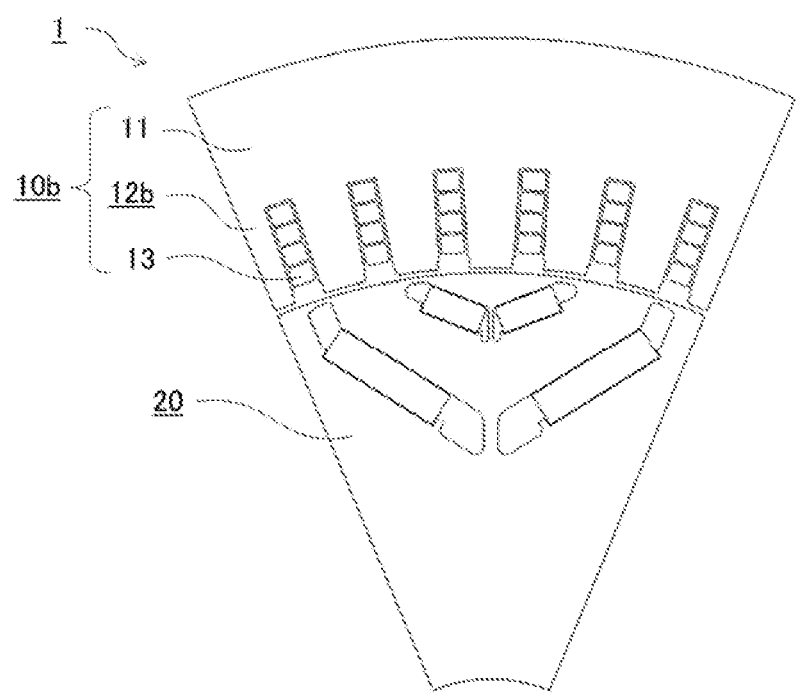
FIG. 46 is a sectional view along a direction perpendicular to the rotation axis of the rotary electric machine in which the tooth end width of a stator core is α2, according to the ninth embodiment.
Figure 47:
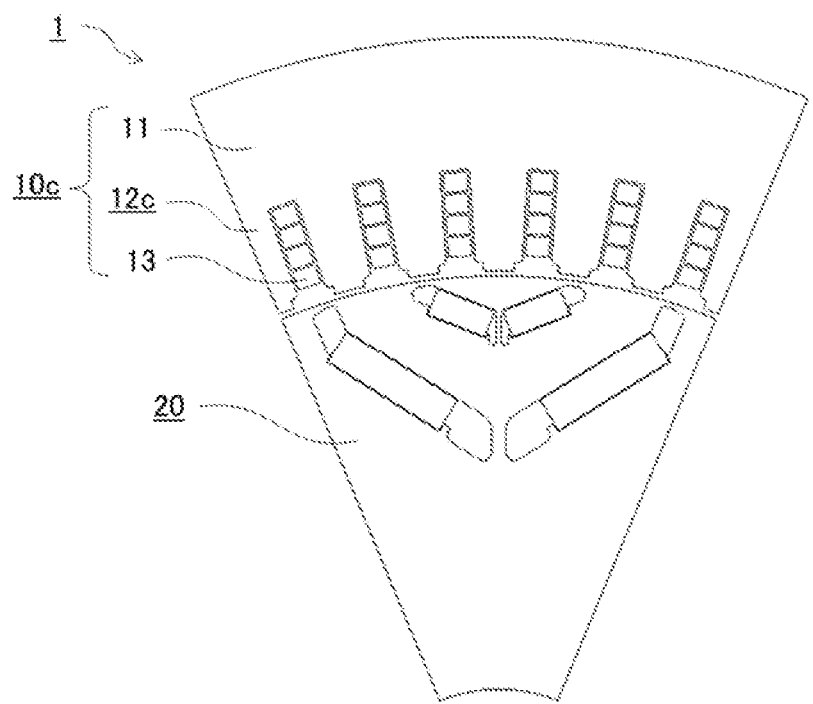
FIG. 47 is a sectional view along a direction perpendicular to the rotation axis of the rotary electric machine in which the tooth end width of a stator core is α3, according to the ninth embodiment.
Figure 48:
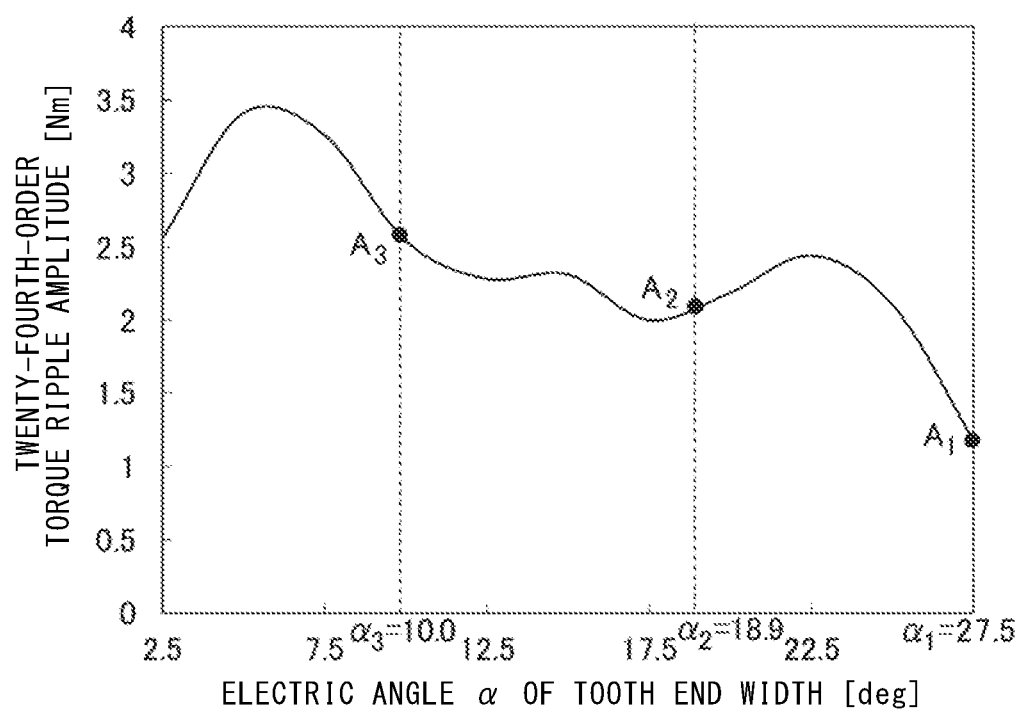
FIG. 48 shows change in the amplitude of twenty-fourth-order torque ripple with respect to a tooth end width α of the stator core when the axial-direction length of the stator core is L in a case of using a rotor of the rotary electric machine according to the ninth embodiment.
Figure 49:
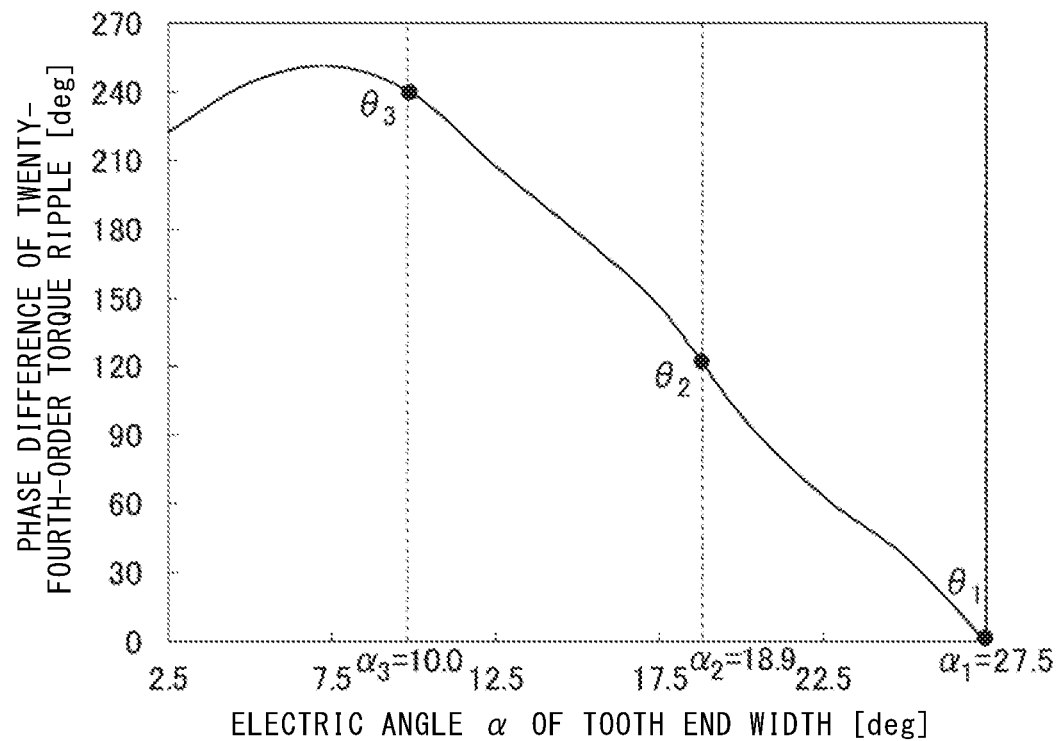
FIG. 49 shows change in a phase difference of twenty-fourth-order torque ripple where a phase when the electric angle of the tooth end width is 27.5 degrees is used as a reference, with respect to the tooth end width α of the stator core, when the axial-direction length of the stator core is L in a case of using the rotor of the rotary electric machine according to the ninth embodiment.
Figure 50:
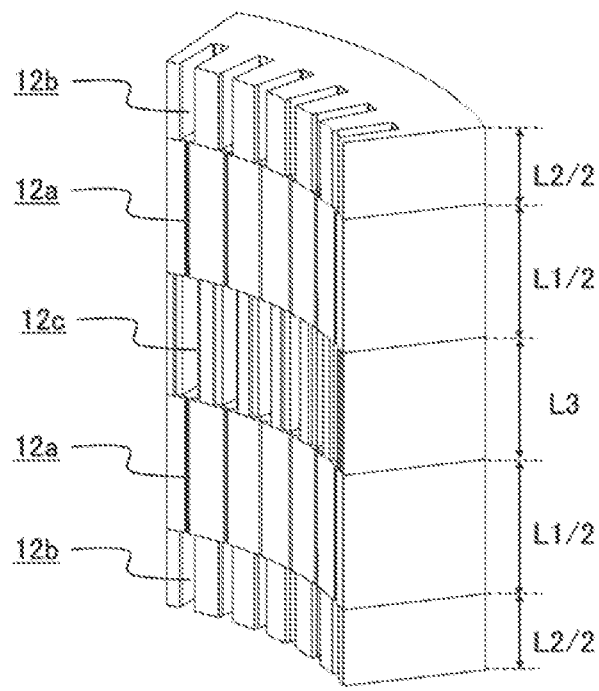
FIG. 50 is a perspective view of a cross-section of ⅛ part in a structure example of a stator of the rotary electric machine according to the ninth embodiment.

FIG. 45 is a sectional view along a direction perpendicular to the rotation axis of a rotary electric machine in which the tooth end width of a stator core is α1, according to the ninth embodiment of the present disclosure. FIG. 46 is a sectional view along a direction perpendicular to the rotation axis of the rotary electric machine in which the tooth end width of a stator core is α2, according to the ninth embodiment. FIG. 47 is a sectional view along a direction perpendicular to the rotation axis of the rotary electric machine in which the tooth end width of a stator core is α3, according to the ninth embodiment. FIG. 48 shows change in the amplitude of twenty-fourth-order torque ripple with respect to the tooth end width α of the stator core when the rotation-axis-direction length of the stator core is L in a case of using a rotor of the rotary electric machine according to the ninth embodiment. FIG. 49 shows change in a phase difference of twenty-fourth-order torque ripple where a phase when the electric angle of the tooth end width is 27.5 degrees is used as a reference, with respect to the tooth end width α of the stator core, when the axial-direction length of the stator core is L in a case of using the rotor of the rotary electric machine according to the ninth embodiment. FIG. 50 shows, by a perspective view, a cross-section of ⅛ part in a structure example of a stator of the rotary electric machine according to the ninth embodiment.

As shown in FIG. 45, the basic configuration of the rotary electric machine of the present embodiment in which the tooth end width of the stator core 12a is α1 is the same as that in FIG. 14, and α1 is 27.5 degrees. As shown in FIG. 46, the basic configuration of the rotary electric machine of the present embodiment in which the tooth end width of the stator core 12b is α2 is the same as that in FIG. 15, but α2 is 18.9 degrees. As shown in FIG. 47, the basic configuration of the rotary electric machine of the present embodiment in which the tooth width of a stator core 12c is α3 is also the same as that in FIG. 15, and α3 is 10.0 degrees.

Thus, in the present embodiment, the tooth end widths of the tooth end portions 122 satisfy α1≥λ>α3 and α1>α2>α3. Although not shown, the configuration of the rotor of the present embodiment is the same as that in FIG. 16, β1 is 52.5 degrees, and β2 is 130.0 degrees.

From FIG. 48 and FIG. 49, it is found that, when the tooth end width α is changed, the amplitude and the phase of twenty-fourth-order torque ripple are changed, as in the first embodiment. Here, the torque ripple H occurring in the rotary electric machine according to the present embodiment is represented by (Expression 1), as in the first embodiment. Here, n is 3 and t is the electric angle of the rotation angle.

In addition, θ1 is 0.0 degrees, θ2 is 120.0 degrees, and θ3 is 240.0 degrees. Thus, the phases of twenty-fourth-order torque ripples occurring in the respective stator cores are shifted from each other by 120 degrees. Therefore, rotation-axis-direction lengths L1, L2, and L3 of the stator core 12a, the stator core 12b, and the stator core 12c that minimize H satisfy L1:L2:L3=59.2:33.7:27.1.

As shown in FIG. 50, the rotary electric machine according to the ninth embodiment includes the stator core 12a having the rotation-axis-direction length L1, the stator core 12b having the rotation-axis-direction length L2, and the stator core 12c having the rotation-axis-direction length L3, and L1, L2, and L3 satisfy L1:L2:L3=59.2:33.7:27.1. The way of stacking the stator cores is the same as that in FIG. 8, thus forming a structure symmetric in the rotation-axis direction.

In this configuration, three kinds of stator cores having different tooth end widths α are combined in the axial direction with L1:L2:L3=59.2:33.7:27.1 satisfied, whereby twenty-fourth-order torque ripple can be suppressed almost completely. Further, forty-eighth-order torque ripple whose order is two times the order of twenty-fourth-order torque ripple can also be suppressed.

Since the stator having combination of the stator core 12a, the stator core 12b, and the stator core 12c is formed symmetrically in the axial direction, magnetic attraction forces acting on the entire rotor can be made symmetric in terms of rotation-axis-direction positions and thus can be balanced. Thus, a force acting in the axial direction of the rotor is reduced, whereby vibration and bearing damage can be prevented.

The same effects are obtained even if the number of stator cores divided in the rotation-axis direction is changed as shown in FIG. 9.

If cutouts are provided on the outer circumference of the rotor core as in the first embodiment, it is possible to suppress twelfth-order torque ripple and twenty-fourth-order torque ripple at the same time, as in the first embodiment.

If the stator cores are stacked such that the ratio of the stator core having a larger tooth end width α, of the three kinds of stator cores, is greater as in the second embodiment, it is possible to increase torque while reducing twenty-fourth-order torque ripple, as in the second embodiment.

If the stator cores are stacked asymmetrically in the rotation-axis direction as in the third embodiment, it is possible to decrease the number of stator cores and improve manufacturing performance.

As in the fifth embodiment, using twenty-fourth-order torque ripple occurring in one of the three kinds of stator cores as a reference, if the stator cores are combined such that each of the phase differences of twenty-fourth-order torque ripples occurring in the other two kinds of stator cores is not less than 90 degrees and not greater than 180 degrees, it is possible to reduce twenty-fourth-order torque ripple.

Tenth Embodiment

[Double-V-Shaped Slots, Four Kinds of Stator Cores, Phase Difference=90 Degrees]

Figure 51:
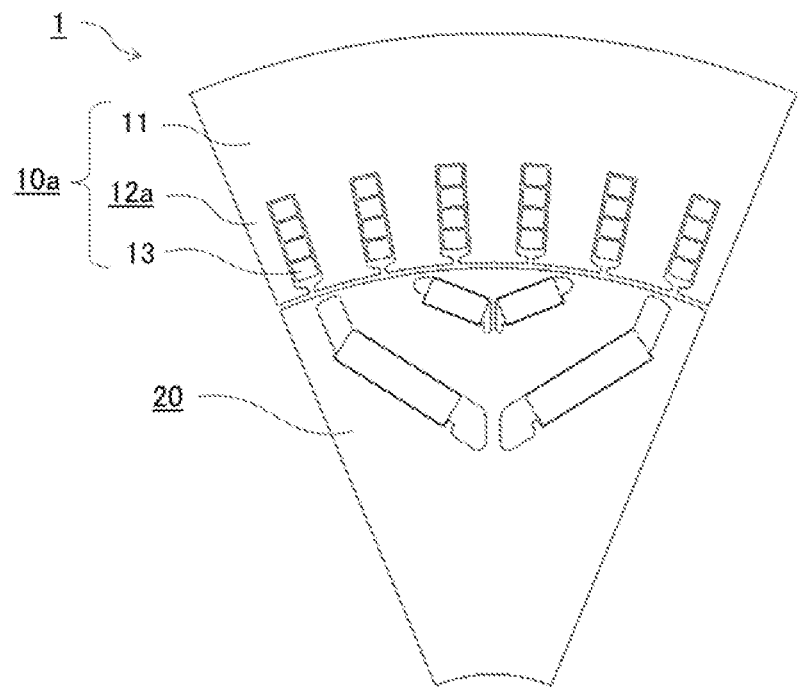
FIG. 51 is a sectional view along a direction perpendicular to the rotation axis of a rotary electric machine in which the tooth end width of a stator core is α1, according to the tenth embodiment of the present disclosure.
Figure 52:
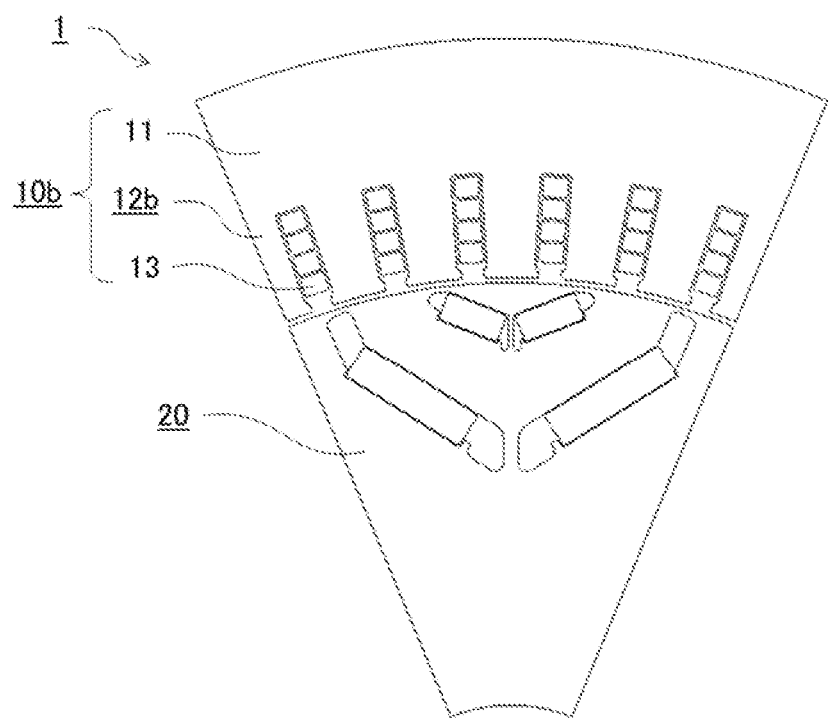
FIG. 52 is a sectional view along a direction perpendicular to the rotation axis of the rotary electric machine in which the tooth end width of a stator core is α2, according to the tenth embodiment.
Figure 53:
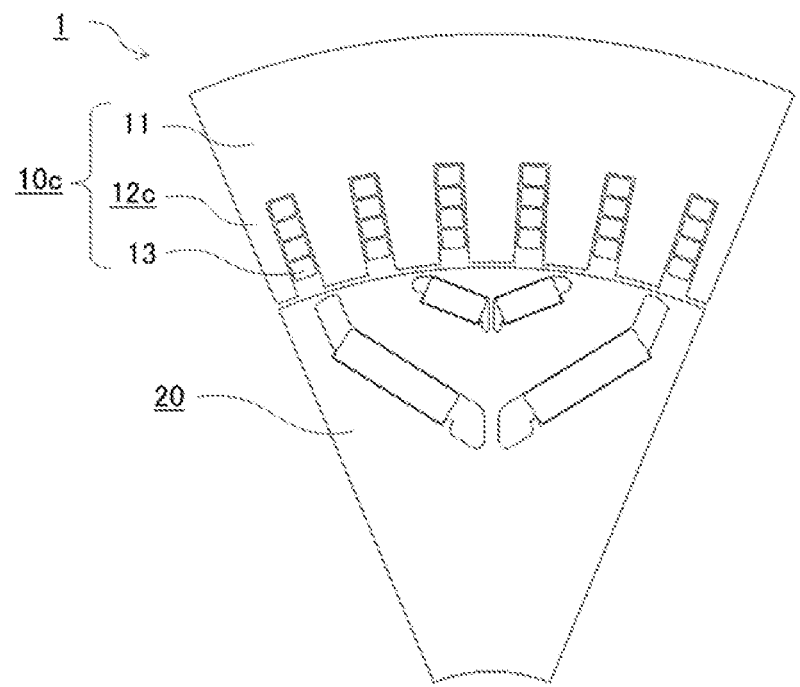
FIG. 53 is a sectional view along a direction perpendicular to the rotation axis of the rotary electric machine in which the tooth end width of a stator core is α3, according to the tenth embodiment.
Figure 54:
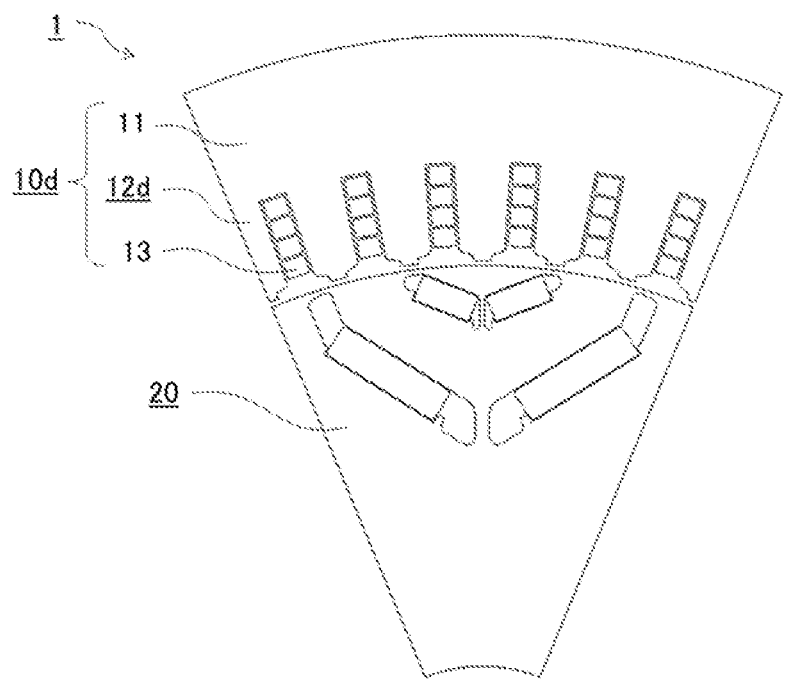
FIG. 54 is a sectional view along a direction perpendicular to the rotation axis of the rotary electric machine in which the tooth end width of a stator core is α4, according to the tenth embodiment.
Figure 55:
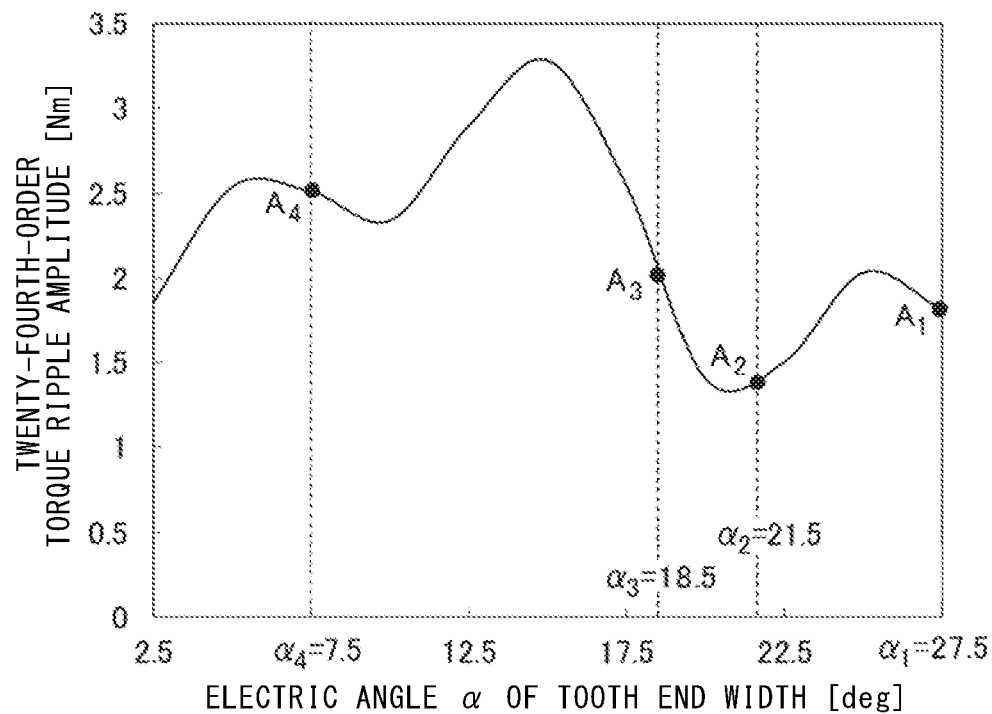
FIG. 55 shows change in the amplitude of twenty-fourth-order torque ripple with respect to a tooth end width α of the stator core when the axial-direction length of the stator core is L in a case of using a rotor of the rotary electric machine according to the tenth embodiment.
Figure 56:
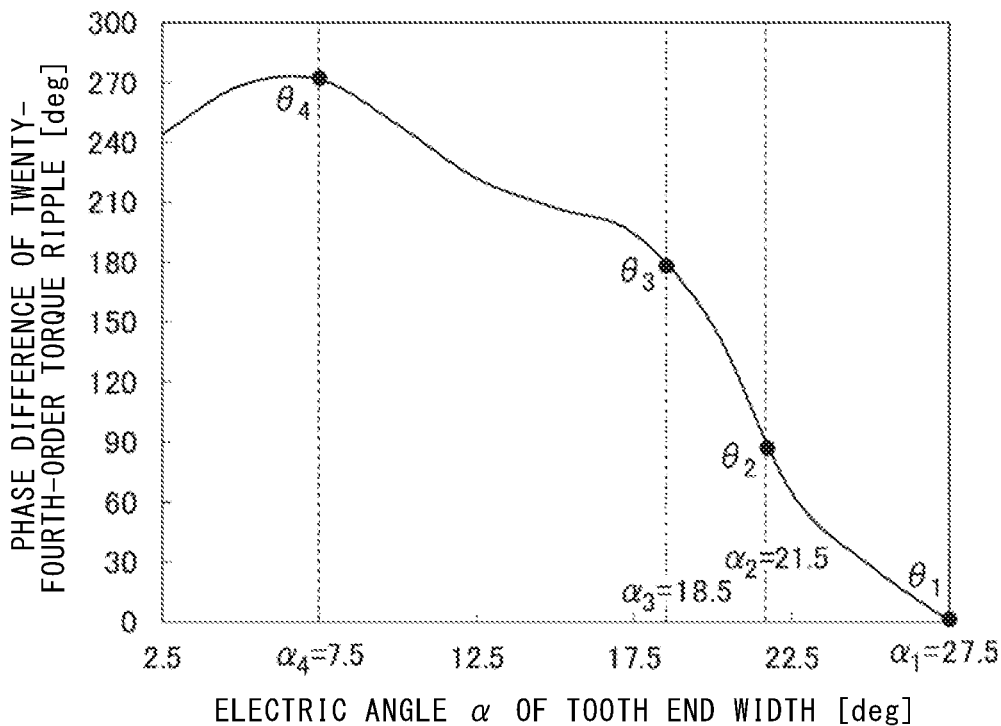
FIG. 56 shows change in a phase difference of twenty-fourth-order torque ripple where a phase when the electric angle of the tooth end width is 27.5 degrees is used as a reference, with respect to the tooth end width α of the stator core, when the axial-direction length of the stator core is L in a case of using the rotor of the rotary electric machine according to the tenth embodiment.
Figure 57:
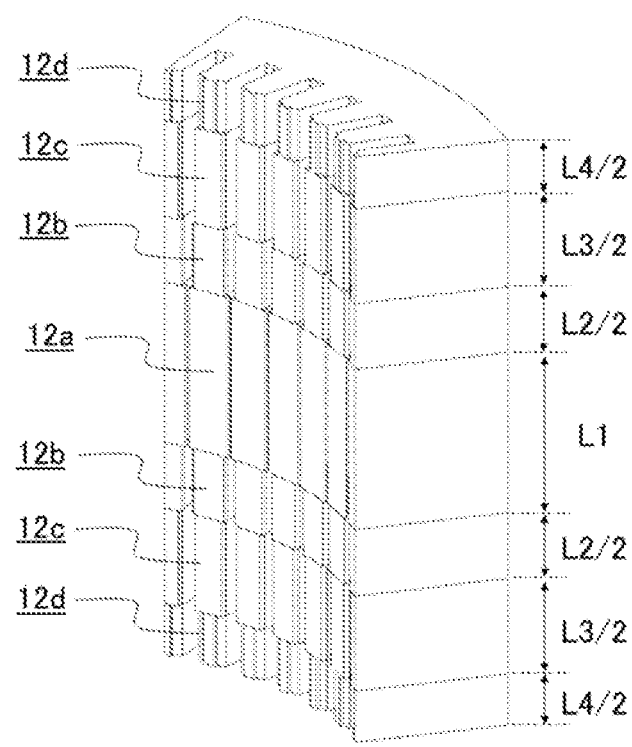
FIG. 57 is a perspective view of a cross-section of ⅛ part in a structure example of a stator of the rotary electric machine according to the tenth embodiment.

FIG. 51 is a sectional view along a direction perpendicular to the rotation axis of a rotary electric machine in which the tooth end width of a stator core is α1, according to the tenth embodiment of the present disclosure. FIG. 52 is a sectional view along a direction perpendicular to the rotation axis of the rotary electric machine in which the tooth end width of a stator core is α2, according to the tenth embodiment. FIG. 53 is a sectional view along a direction perpendicular to the rotation axis of the rotary electric machine in which the tooth end width of a stator core is α3, according to the tenth embodiment. FIG. 54 is a sectional view along a direction perpendicular to the rotation axis of the rotary electric machine in which the tooth end width of a stator core is α4, according to the tenth embodiment. FIG. 55 shows change in the amplitude of twenty-fourth-order torque ripple with respect to the tooth end width α of the stator core when the axial-direction length of the stator core is L in a case of using a rotor of the rotary electric machine according to the tenth embodiment. FIG. 56 shows change in a phase difference of twenty-fourth-order torque ripple where a phase when the electric angle of the tooth end width is 27.5 degrees is used as a reference, with respect to the tooth end width α of the stator core, when the axial-direction length of the stator core is L in a case of using the rotor of the rotary electric machine according to the tenth embodiment. FIG. 57 shows, by a perspective view, a cross-section of ⅛ part in a structure example of a stator of the rotary electric machine according to the tenth embodiment.

As shown in FIG. 51, the basic configuration of the rotary electric machine of the present embodiment in which the tooth end width of the stator core 12*a* is α1 is the same as that in FIG. 14, and α1 is 27.5 degrees. As shown in FIG. 52, the basic configuration of the rotary electric machine of the present embodiment in which the tooth end width of the stator core 12*b* is α2 is also the same as that in FIG. 14, but α2 is 21.5 degrees. As shown in FIG. 53, the basic configuration of the rotary electric machine of the present embodiment in which the tooth end width of the stator core 12*c* is α3 is the same as that in FIG. 15, but α3 is 18.5 degrees. As shown in FIG. 54, the basic configuration of the rotary electric machine of the present embodiment in which the tooth end width of the stator core 12*d* is α4 is also the same as that in FIG. 15, but α4 is 7.5 degrees.

As described above, in the present embodiment, the tooth end portions 122 satisfy α1≥λ>α4 and α1>α2>α3>α4.

Although not shown, the configuration of the rotor of the present embodiment is the same as that in FIG. 16, β1 is 50.0 degrees, and β2 is 130.0 degrees.

From FIG. 55 and FIG. 56, it is found that, when the tooth end width α is changed, the amplitude and the phase of twenty-fourth-order torque ripple are changed, as in the first embodiment. Here, the torque ripple H occurring in the rotary electric machine according to the present embodiment is represented by (Expression 1), as in the first embodiment. Here, n is 4 and t is the electric angle of the rotation angle.

In addition, θ1 is 0.0 degrees, θ2 is 90.0 degrees, θ3 is 180.0 degrees, θ4 is 270.0 degrees, and the phases of twenty-fourth-order torque ripples occurring in the respective stator cores are shifted from each other by 90 degrees. Therefore, the rotation-axis-direction lengths L1, L2, L3, and L4 of the stator core 12*a*, the stator core 12*b*, the stator core 12*c*, and the stator core 12*d* that minimize H satisfy L1:L2:L3:L4=27.5:22.5:32.5:17.5.

As shown in FIG. 57, the rotary electric machine according to the present embodiment includes the stator core 12*a* having the rotation-axis-direction length L1, the stator core 12*b* having the rotation-axis-direction length L2, the stator core 12*c* having the rotation-axis-direction length L3, and the stator core 12*d* having the rotation-axis-direction length L4, and L1, L2, L3, and L4 satisfy L1:L2:L3:L4=27.5:22.5:32.5:17.5. The way of stacking the stator cores is the same as that in FIG. 8, thus forming a structure symmetric in the rotation-axis direction.

In this configuration, four kinds of stator cores having different tooth end widths α are combined in the axial direction with L1:L2:L3:L4=27.5:22.5:32.5:17.5 satisfied, whereby twenty-fourth-order torque ripple can be suppressed almost completely. Further, forty-eighth-order torque ripple whose order is two times the order of twenty-fourth-order torque ripple can also be suppressed. Since the stator having combination of the stator core 12*a*, the stator core 12*b*, the stator core 12*c*, and the stator core 12*d* is formed symmetrically in the rotation-axis direction, magnetic attraction forces acting on the entire rotor can be made symmetric in terms of rotation-axis-direction positions and thus can be balanced. Thus, a force acting in the axial direction of the rotor is reduced, whereby vibration and bearing damage can be prevented.

The same effects are obtained even if the number of stator cores divided in the rotation-axis direction is changed as shown in FIG. 9.

If cutouts are provided on the outer circumference of the rotor core as in the first embodiment, it is possible to suppress twelfth-order torque ripple and twenty-fourth-order torque ripple at the same time.

If the stator cores are stacked such that the ratio of the stator core having a larger tooth end width α, of the three kinds of stator cores, is greater as in the second embodiment, it is possible to increase torque while reducing twenty-fourth-order torque ripple.

If the stator cores are stacked asymmetrically in the rotation-axis direction as in the third embodiment, it is possible to decrease the number of stator cores and improve manufacturing performance.

As in the fifth embodiment, using twenty-fourth-order torque ripple occurring in one of the four kinds of stator cores as a reference, if the stator cores are combined such that each of the phase differences of twenty-fourth-order torque ripples occurring in the other three kinds of stator cores is not less than 90 degrees and not greater than 180 degrees, it is possible to reduce twenty-fourth-order torque ripple.

In the first to tenth embodiments, the tooth width λ is the same among a plurality of stator cores. However, the tooth width λ may be different among a plurality of cores. Also in such a configuration, the same effects as those in the first to tenth embodiments can be obtained.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS

1 motor
10*a*, 10*b* stator
11 stator back core
12*a*, 12*b*, 12*c*, 12*d* stator core
13 stator coil
20 rotor
21 rotor core
121 tooth extension portion
122 tooth end portion
201, 202, 203 magnet
211, 212, 213 magnet slot
221, 222 cutout

What is claimed is:
1. A rotary electric machine comprising:
a stator having a stator core; and a rotor having a rotor core and a plurality of permanent magnets fixed to the rotor core, the rotor being rotatable relative to the stator, wherein the stator core has an annular core back and a plurality of teeth protruding in a radial direction from the core back, with slots formed between the teeth of the stator core, the stator core is formed by combining, in a rotation-axis direction of the rotor, a plurality of kinds of stator core portions having different tooth end shapes, and among the tooth end shapes of the plurality of kinds of stator core portions, at least one kind of tooth end shape has brims extending in a circumferential direction from the tooth and a minimum value of an electric angle of a tooth end width thereof is greater than a width of the tooth, and at least another one kind of tooth end shape is such a shape that the tooth is cut in the circumferential direction and a maximum value of an electric angle of a tooth end width thereof is smaller than a width of the tooth.

2. The rotary electric machine according to claim 1, wherein
stator coils are wound around the plurality of teeth so as to form a distributed winding structure.

3. The rotary electric machine according to claim 2, wherein
the stator core is formed by combining, in the rotation-axis direction, two kinds of the stator core portions of which electric angles of tooth end widths are different from each other.

4. The rotary electric machine according to claim 2, wherein
the stator core is formed such that the stator core portions of which electric angles of tooth end widths are different from each other are stacked symmetrically in the rotation-axis direction.

5. The rotary electric machine according to claim 2, wherein
the rotor has a structure in which the permanent magnets are arranged in two layers in the radial direction,
on an outer circumference of the rotor, cutouts are formed at four positions symmetrically with respect to a d axis, and
where an angle formed by two lines connecting a rotation center of the rotor and two rotor-surface-side corners of the permanent magnets is defined as a magnet pole arc angle, and an angle formed by two lines connecting the rotation center of the rotor and centers of arcs forming the cutouts is defined as a cutout angle, the cutouts are formed at positions where the cutout angle is smaller than an electric angle of the magnet pole arc angle in a first layer, and positions where the cutout angle is greater than the electric angle of the magnet pole arc angle in the first layer and is smaller than an electric angle of the magnet pole arc angle in a second layer.

6. The rotary electric machine according to claim 1, wherein
the stator core is formed by combining, in the rotation-axis direction, two kinds of the stator core portions of which electric angles of tooth end widths are different from each other.

7. The rotary electric machine according to claim 1, wherein
the stator core is formed by combining, in the rotation-axis direction, at least three kinds of the stator core portions of which electric angles of tooth end widths are different from each other.

8. The rotary electric machine according to claim 1, wherein
the stator core is formed such that the stator core portions of which electric angles of tooth end widths are different from each other are stacked symmetrically in the rotation-axis direction.

9. The rotary electric machine according to claim 1, wherein
where a rotation-axis-direction length of the stator core is denoted by L, a rotation-axis-direction length of each stator core portion is denoted by Lk, an amplitude and a phase of Nth-order torque ripple occurring in each stator core portion are respectively denoted by Ak and θk, and an electric angle of a rotation angle is denoted by t, a value H obtained by summing the Nth-order torque ripples occurring in the respective stator core portions is represented by the following expression:

[Mathematical 4]

$$H = \sum_{k=1}^{n} \frac{L_k}{L} A_k \cos(t + \theta_k),$$

and
a plurality of the stator core portions that minimize the value H obtained by summing the Nth-order torque ripples are combined.

10. The rotary electric machine according to claim 1, wherein
the rotor has a structure in which the permanent magnets are arranged in two layers in the radial direction,
on an outer circumference of the rotor, cutouts are formed at four positions symmetrically with respect to a d axis, and
where an angle formed by two lines connecting a rotation center of the rotor and two rotor-surface-side corners of the permanent magnets is defined as a magnet pole arc angle, and an angle formed by two lines connecting the rotation center of the rotor and centers of arcs forming the cutouts is defined as a cutout angle, the cutouts are formed at positions where the cutout angle is smaller than an electric angle of the magnet pole arc angle in a first layer, and positions where the cutout angle is greater than the electric angle of the magnet pole arc angle in the first layer and is smaller than an electric angle of the magnet pole arc angle in a second layer.

11. A rotary electric machine comprising:
a stator having a stator core; and
a rotor having a rotor core and a plurality of permanent magnets fixed to the rotor core, the rotor being rotatable relative to the stator, wherein
the stator core has an annular core back and a plurality of teeth protruding in a radial direction from the core back, with slots formed between the teeth of the stator core,
the stator core is formed by combining, in a rotation-axis direction of the rotor, a plurality of kinds of stator core portions of which tooth end shapes have brims extending in a circumferential direction and electric angles of tooth end widths are different from each other,
the rotor has a structure in which the permanent magnets are arranged in two layers in the radial direction,
on an outer circumference of the rotor, cutouts are formed at four positions symmetrically with respect to a d axis, and where an angle formed by two lines connecting a rotation center of the rotor and two rotor-surface-side corners of the permanent magnets is defined as a magnet pole arc angle, and an angle formed by two lines connecting the rotation center of the rotor and centers of arcs forming the cutouts is defined as a cutout angle, the cutouts are formed at positions where the cutout angle is smaller than an electric angle of the magnet pole arc angle in a first layer, and positions where the cutout angle is greater than the electric angle of the magnet pole arc angle in the first layer and is smaller than an electric angle of the magnet pole arc angle in a second layer.

12. The rotary electric machine according to claim 11, wherein
the rotor has a structure in which the permanent magnets fixed to the rotor core are arranged in two layers, and
where an angle formed by two lines connecting a rotation center of the rotor and two rotor-surface-side corners of the permanent magnets is defined as a magnet pole arc angle, and electric angles of the magnet pole arc angles in a first layer and a second layer are respectively denoted by β1 and β2, the following expression is satisfied:

$$\beta_2 = 0.6\beta_1 + C \ (47.5 \leq \beta_1 \leq 52.5, 98.5 \leq C \leq 100.0),$$ [Mathematical 3]

where C is a real number in a range of 98.5≤C≤100.0.

13. The rotary electric machine according to claim 12, wherein
the stator core is formed by combining, in the rotation-axis direction, two kinds of the stator core portions of which electric angles of tooth end widths are different from each other.

14. The rotary electric machine according to claim 12, wherein
the stator core is formed such that the stator core portions of which electric angles of tooth end widths are different from each other are stacked symmetrically in the rotation-axis direction.

15. The rotary electric machine according to claim 11, wherein
the stator core is formed by combining, in the rotation-axis direction, two kinds of the stator core portions of which electric angles of tooth end widths are different from each other.

16. The rotary electric machine according to claim 11, wherein
the stator core is formed such that the stator core portions of which electric angles of tooth end widths are different from each other are stacked symmetrically in the rotation-axis direction.

17. A rotary electric machine comprising:
a stator having a stator core; and
a rotor having a rotor core and a plurality of permanent magnets fixed to the rotor core, the rotor being rotatable relative to the stator, wherein
the stator core has an annular core back and a plurality of teeth protruding in a radial direction from the core back, with slots formed between the teeth of the stator core, and
the stator core is formed by combining, in a rotation-axis direction of the rotor, a plurality of kinds of stator core portions of which tooth end shapes have brims extending in a circumferential direction and electric angles of tooth end widths are different from each other,
stator coils are wound around the plurality of teeth so as to form a distributed winding structure.

* * * * *